US009377737B2

(12) United States Patent
Nonaka

(10) Patent No.: US 9,377,737 B2
(45) Date of Patent: Jun. 28, 2016

(54) IMAGE FORMING APPARATUS, CONTROL METHOD OF IMAGE FORMING APPARATUS, AND STORAGE MEDIUM FOR CONTROLLING IMAGE FORMATION ON A SHEET

(71) Applicant: CANON KABUSHIKI KAISHA, Tokyo (JP)

(72) Inventor: Takashi Nonaka, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/673,711

(22) Filed: Mar. 30, 2015

(65) Prior Publication Data

US 2015/0277321 A1 Oct. 1, 2015

(30) Foreign Application Priority Data

Mar. 31, 2014 (JP) ................................ 2014-072161

(51) Int. Cl.

*G03G 15/00* (2006.01)
*G06F 3/12* (2006.01)
*H04N 1/387* (2006.01)
*H04N 1/00* (2006.01)

(52) U.S. Cl.

CPC ............ *G03G 15/50* (2013.01); *G03G 15/6591* (2013.01); *G06F 3/125* (2013.01); *G06F 3/1208* (2013.01); *G06F 3/1285* (2013.01); *G03G 15/502* (2013.01); *G03G 15/5016* (2013.01); *G03G 15/6538* (2013.01); *G03G 15/6541* (2013.01); *G03G 2215/00751* (2013.01); *G03G 2215/00827* (2013.01); *H04N 1/00* (2013.01); *H04N 1/387* (2013.01)

(58) Field of Classification Search

CPC ...................................................... G03G 15/50
USPC ........................................................... 399/82
See application file for complete search history.

(56) References Cited

U.S. PATENT DOCUMENTS

2010/0183405 A1* 7/2010 Nonaka ............................. 412/6
2011/0058840 A1* 3/2011 Tsujita ............................ 399/82
2014/0159306 A1* 6/2014 Nonaka ......................... 271/288

FOREIGN PATENT DOCUMENTS

JP 11-243486 A 9/1999
JP 1999-243486 * 9/1999 ............. G03G 15/36

* cited by examiner

*Primary Examiner* — Clayton E LaBalle
*Assistant Examiner* — Kevin Butler
(74) *Attorney, Agent, or Firm* — Canon U.S.A., Inc. IP Division

(57) ABSTRACT

An image forming apparatus can create various output products using a transparent sheet as intended by a user.

7 Claims, 17 Drawing Sheets

FIG.7
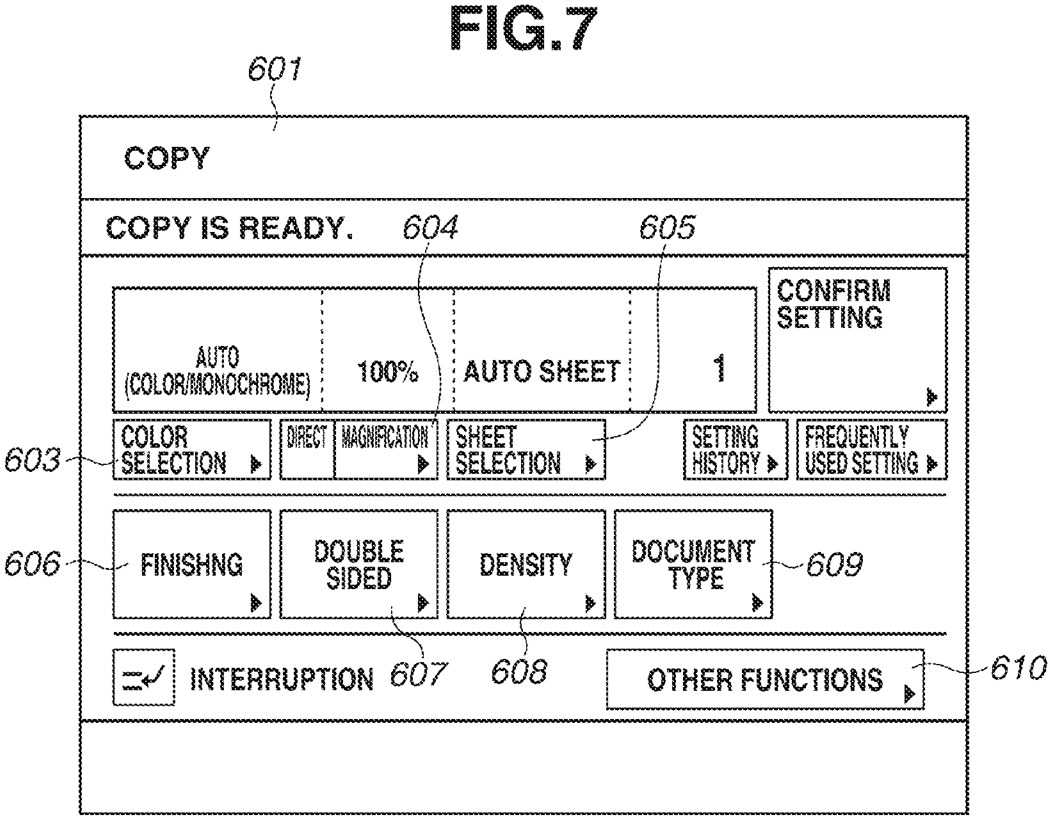
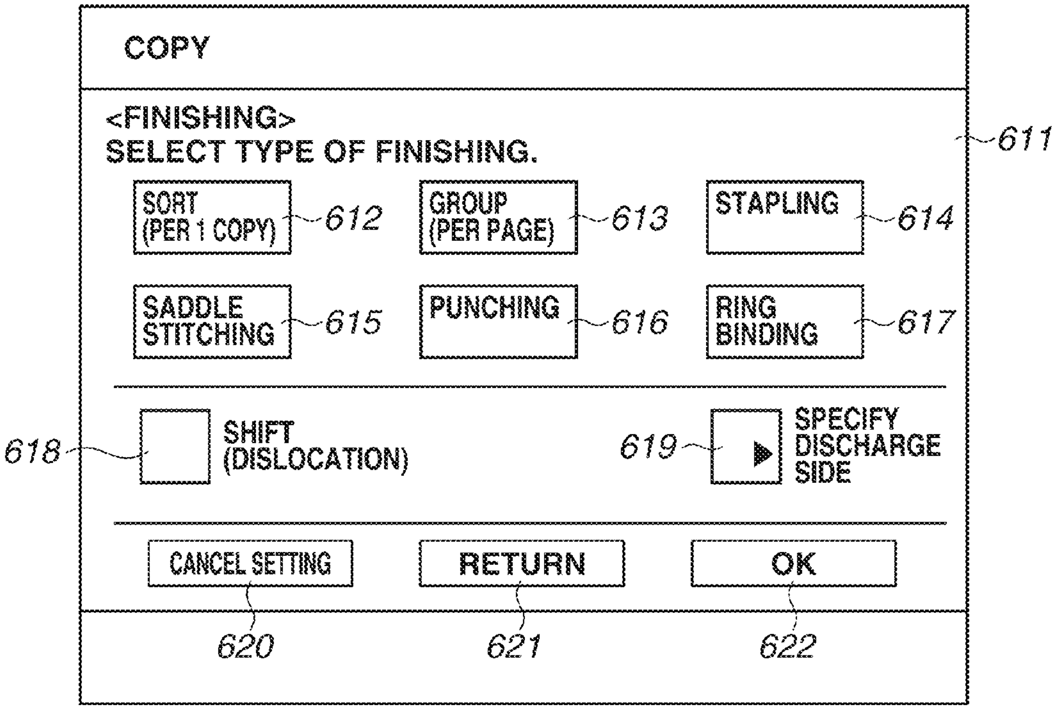

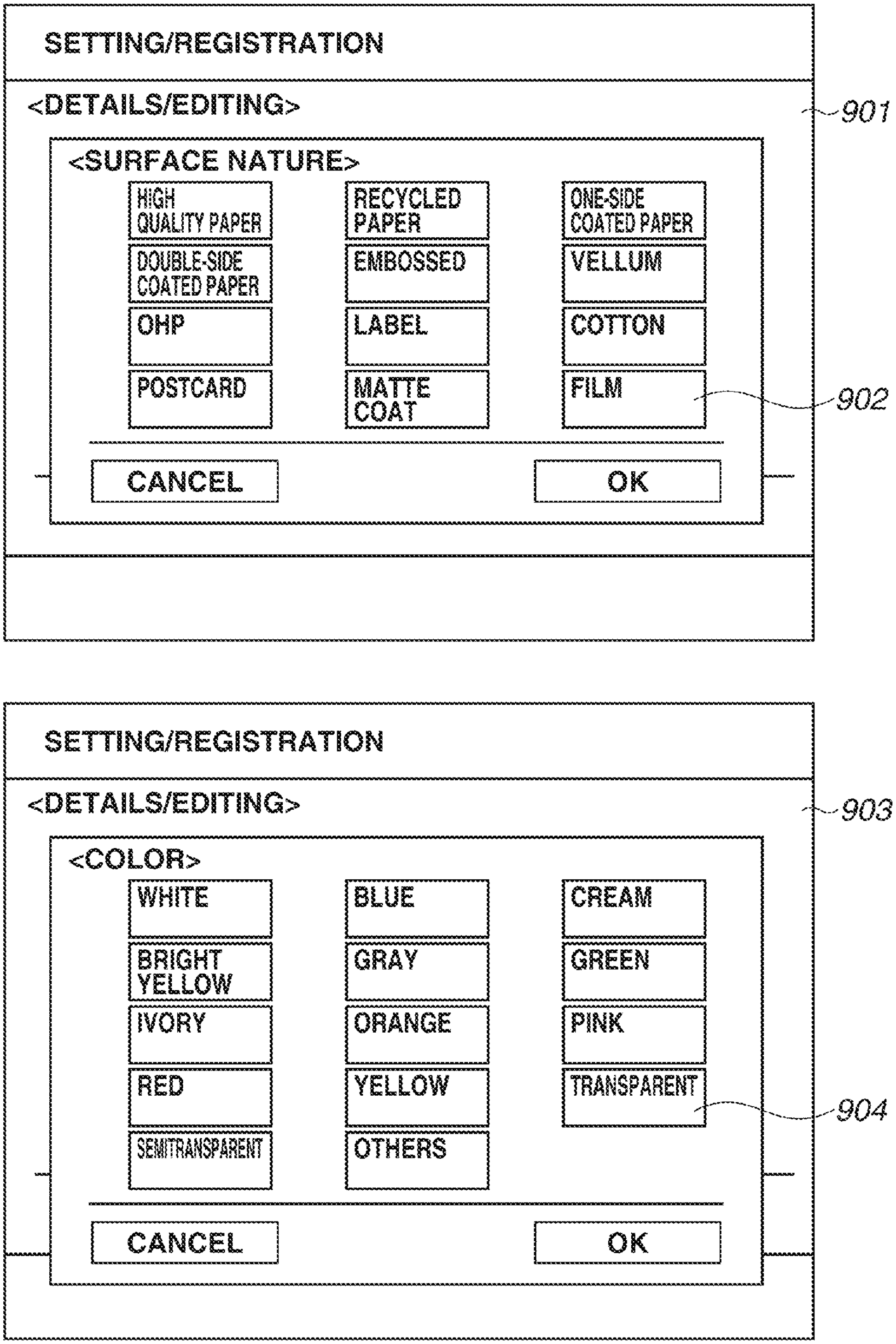

FIG.10

SETTING/REGISTRATION

<DETAILS/EDITING> — 901

<SURFACE NATURE>

| HIGH QUALITY PAPER | RECYCLED PAPER | ONE-SIDE COATED PAPER |
| --- | --- | --- |
| DOUBLE-SIDE COATED PAPER | EMBOSSED | VELLUM |
| OHP | LABEL | COTTON |
| POSTCARD | MATTE COAT | FILM |

— 902

| CANCEL | OK |
| --- | --- |

SETTING/REGISTRATION

<DETAILS/EDITING> — 903

<COLOR>

| WHITE | BLUE | CREAM |
| --- | --- | --- |
| BRIGHT YELLOW | GRAY | GREEN |
| IVORY | ORANGE | PINK |
| RED | YELLOW | TRANSPARENT |
| SEMITRANSPARENT | OTHERS | |

— 904

| CANCEL | OK |
| --- | --- |

IMAGE FORMING APPARATUS, CONTROL METHOD OF IMAGE FORMING APPARATUS, AND STORAGE MEDIUM FOR CONTROLLING IMAGE FORMATION ON A SHEET

BACKGROUND OF THE INVENTION

1. Field of the Invention

The present invention relates to an image forming apparatus, a control method of the image forming apparatus, and a storage medium.

2. Description of the Related Art

An image forming apparatus which can perform printing on various recording media is needed in a print market. There are various types of recording media, such as commonly-used paper referred to as plain paper, coated paper having a coated surface, glossy paper, punched paper on which punched holes are preliminarily provided, and index paper having a tab portion. In this situation, printing on a transparent recording medium is also demanded. The transparent recording medium may be used as a transparency to be projected by an overhead projector and as a cover sheet of a booklet like a catalogue and a pamphlet. The needs to use these transparent recording media as a part of a print product are expected to further increase in the future.

With respect to such growing needs, a print mode to a transparent recording medium in the current situation is most likely a mode to use the recording medium alone as a transparency.

When a conventional image forming apparatus performs printing on transparencies as a recording medium, if a conveyance path for reversing a sheet after printing in the apparatus and a double-sided conveyance path are provided therein, the apparatus performs control to limit conveyance to those conveyance paths from an aspect of a conveyance performance of a recording medium. Thus, when printing is performed on a transparent recording medium, the recording medium subjected to printing is only discharged outside of the image forming apparatus without being reversed.

Therefore, in the case of the image forming apparatus which forms an image from above to a conveyed recording medium, when printing is performed on a transparent recording medium, the recording medium is always discharged face up since the apparatus can only discharge the recording medium after printing as it is outside of the apparatus. When a document to be printed on a transparent recording medium includes a plurality of pages, pages are printed face up in order from a first page. Thus, if the document is printed as it is, an order of pages in an output product are reversed.

In order to solve this issue, Japanese Patent Application Laid-Open No. 11-243486 discusses a technique for forming an image of a print document data as a mirror image when printing is performed on a transparent recording medium. Printing is performed by facing up on a print side, and a printed image is a mirror image, so that a user will see the print side through the output recording medium. Thus, an output product seems like a resultant product which is output face down and includes pages in the correct order for the user.

However, the technique discussed in Japanese Patent Application Laid-Open No. 11-243486 is not sufficient for handling of various output products using transparent recording media. For example, the relevant technique cannot handle a case when a resultant product is created using transparent films on a front cover and a back cover. When a user intends to print images on a front cover and on a back cover, it would generally be thought that the user intends to print an image of the front cover on a front side and an image of the back cover on a back side. When a face-down output is assumed, according to the control discussed in Japanese Patent Application Laid-Open No. 11-243486, an image appearing on the front side of the front cover is actually a mirror image printed on the back side, and thus it seems that a correct image is printed on the front side of the front cover when the recording medium is seen through from a face-down side. Similarly, a mirror image is printed on the back side of the back cover, it seems that a correct image is printed when the recording medium is seen from the front side of the back cover.

The output product that the user originally intends to is the one in which a normal image (defined as an antonym of a mirror image) can be seen from the back side of the back cover as a face-up side, however, such an output product cannot be obtained by the technique discussed in Japanese Patent Application Laid-Open No. 11-243486.

The advancement in the conveyance technique of recording media in the recent image forming apparatuses enables transparent recording media to be conveyed through a conveyance path for reversing the medium after printing in the apparatus and a double-sided conveyance path. Along with the advancement of the conveyance technique, provision of an image forming apparatus which can handle various output products using transparent recording media is demanded.

SUMMARY OF THE INVENTION

According to an aspect of the present invention, an image forming apparatus capable of forming an image on a sheet and discharging the sheet by reversing or without reversing the sheet includes a control unit configured to control image formation on a sheet and discharge of the sheet based on a job for forming an image on the sheet including a transparent sheet. The job includes specification of an image forming surface of the transparent sheet. In a case that a type of a sheet subjected to image formation is the transparent sheet, the control unit performs control to form a mirror image of an image to be formed on the sheet on an opposite side of the image forming surface specified to the sheet, to discharge the sheet without reversing the sheet when a first side of the sheet is specified as the image forming surface, and to discharge the sheet by reversing the sheet when a second side of the sheet is specified as the image forming surface.

Further features of the present invention will become apparent from the following description of exemplary embodiments with reference to the attached drawings.

BRIEF DESCRIPTION OF THE DRAWINGS

FIG. 7 illustrates examples of a copy function screens.

FIG. 10 illustrates an example of screens for setting a sheet type.

DESCRIPTION OF THE EMBODIMENTS

Various exemplary embodiments, features, and aspects of the invention will be described in detail below with reference to the drawings.

Before describing control in an image forming apparatus according to the present invention, control by a conventional image forming apparatus when forming an image on an opaque recording medium is described with reference to FIGS. 14 and 15.

Figure 14:
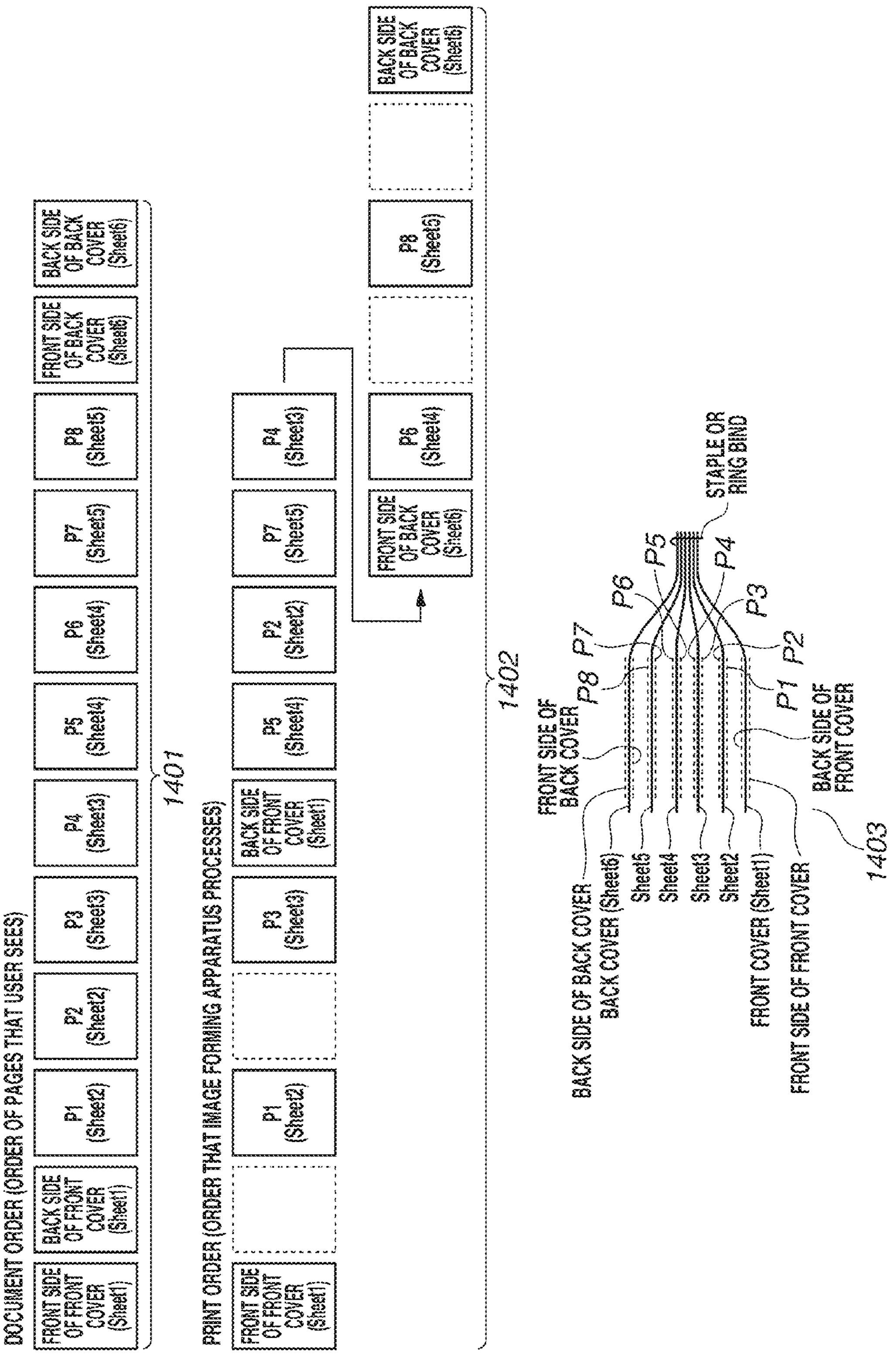
FIG. 14 illustrates an example of conventional control.
Figure 15:
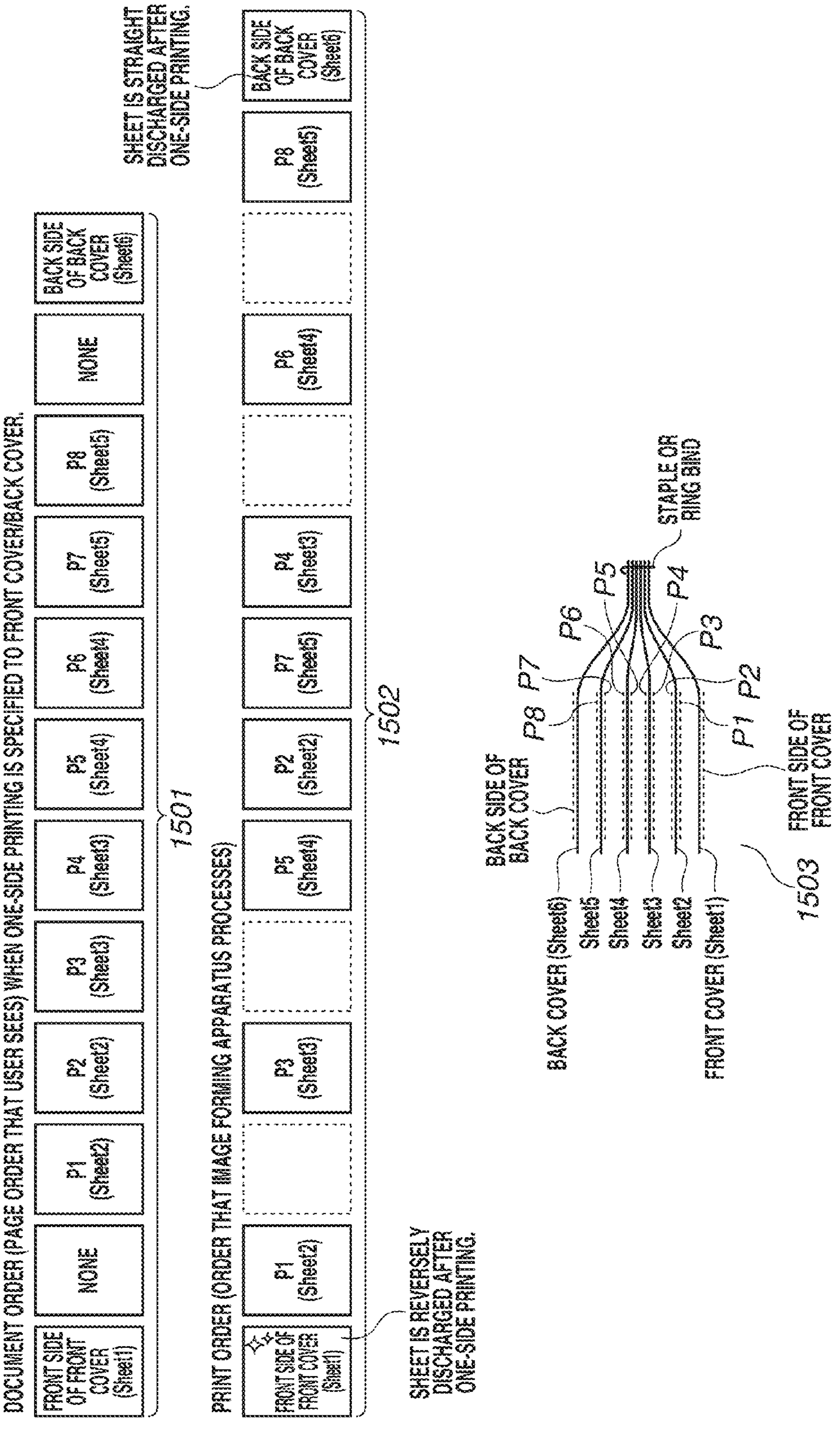
FIG. 15 illustrates an example of conventional control.

FIGS. 14 and 15 illustrate the control in the conventional image forming apparatus.

FIG. 14 illustrates an example of a setting when printing is performed on both of front side/back side of a front cover, both sides of eight pages of a body, and both of front side/back side of a back cover. When a user refers to electric data as a print document, print pages are arranged in an order 1401 from the left of the drawing.

Next, an order 1402 is an order that an image forming apparatus main body 301 and an image fixing apparatus 302 in FIG. 4, which are described below, form images. In this example, images are formed on both sides of all of the front cover, the body, and the back cover, and printing is performed on the front side and then on the back side of each sheet alternately by passing through the double-sided conveyance path. Thus, the printing order is to be the order 1402.

Further, in this example, there are three waiting positions in the double-sided conveyance path. First, the front side of the front cover is printed on a first sheet. Next, a page P1 is printed on a front side of a second sheet. Then, a page P3 is printed on a front side of a third sheet. These three sheets are conveyed to the double-sided conveyance path. At this time point, the three waiting positions in the double-sided conveyance path are all occupied, and it is necessary to perform printing on a second side of the sheets in the double-sided conveyance path. Thus, printing of the back side of the front cover is performed on the first sheet. Next, one of the waiting positions in the double-sided conveyance path is empty, so that a page P5 is printed on a front side of a fourth sheet, and the fourth sheet is conveyed to the double-sided conveyance path. Subsequently, the back sides and the front sides of the sheets are alternately printed. When the front side of the back cover is printed on a sixth sheet, namely a last sheet, the sheets in the double-sided conveyance path are all waiting to be printed on the back side, and printing is performed in the order of a page P6, a page P8, and the back side of the back cover. The printed six sheets are stapled by a finisher 334 as a finishing apparatus or bound with rings by a ring binder 371 and then output to a predetermined discharged destination.

Thus, a sheet bundle 1403 is output. Images printed on the sheets are indicated as dotted lines on the print side. In the example, it is shown that all of sheet 1 to sheet 6 are subjected to double-sided printing. A right side of the sheets are bound by staples or rings. In addition, the example shows that the sheets stacked on a discharge tray are printed in the correct order when a user refers to it from the face-down side. Further, in this example, the print sheets are all opaque, and all images are formed as normal images.

Next, an example when a print setting of the front cover/back cover is specified on only one side is described with reference to FIG. 15. In this example, selected recording media are all opaque sheets.

Similar to the order 1401 in FIG. 14, a user refers to electric data as a print document in a page order 1501. The example is the case when printing is set to be performed only the front side on the front cover and the back side of the back cover, and double-sided printing is specified to sheets for the body. The control similar to that in FIG. 14 can be performed in this setting. More specifically, the control may be performed to assign a blank image to the print sides of the front cover and the back cover, which are set not to be printed, and perform double-sided conveyance. FIG. 15 illustrates a case that printing of the front cover and the back cover can be realized by single-sided conveyance.

An order 1502 is that of the image forming apparatus performed printing. Single-sided printing is performed on the front side of the front cover, then the sheet is reversely discharged. In the image forming apparatus, image forming is performed from above the recording medium, and an image is formed on a face-up side. The sheet is reversed in a sheet reversing mechanism after the printing, so that an image formed side comes to the front side when the sheet is output face down. Image formation on a page P1 to a page P9, which are pages of the body, is similar to that in FIG. 14. Sheets are fed with the front side up and the back side up alternately, so that a plurality of pages is output by being printed on both sides. On the back cover, image formation is specified only on the back side. The image formation of the back side is executed by single-sided printing, and then the sheet is discharged straight. Printing is performed on the face-up side of the recording medium, the sheet is discharged face down on the discharge tray by being discharged straight in a state in which the back side of the back cover is printed.

According to the above-described control, a sheet bundle 1503 is output. Both of the front cover and the back cover are printed on the outside of the sheet bundle 1503. Since the opaque recording medium is selected to the front cover and the back cover, normal images are printed on the both sheets.

Next, image formation and conveyance control by the image forming apparatus according to the present invention are described with reference to FIGS. 1 and 2.

Figure 1:
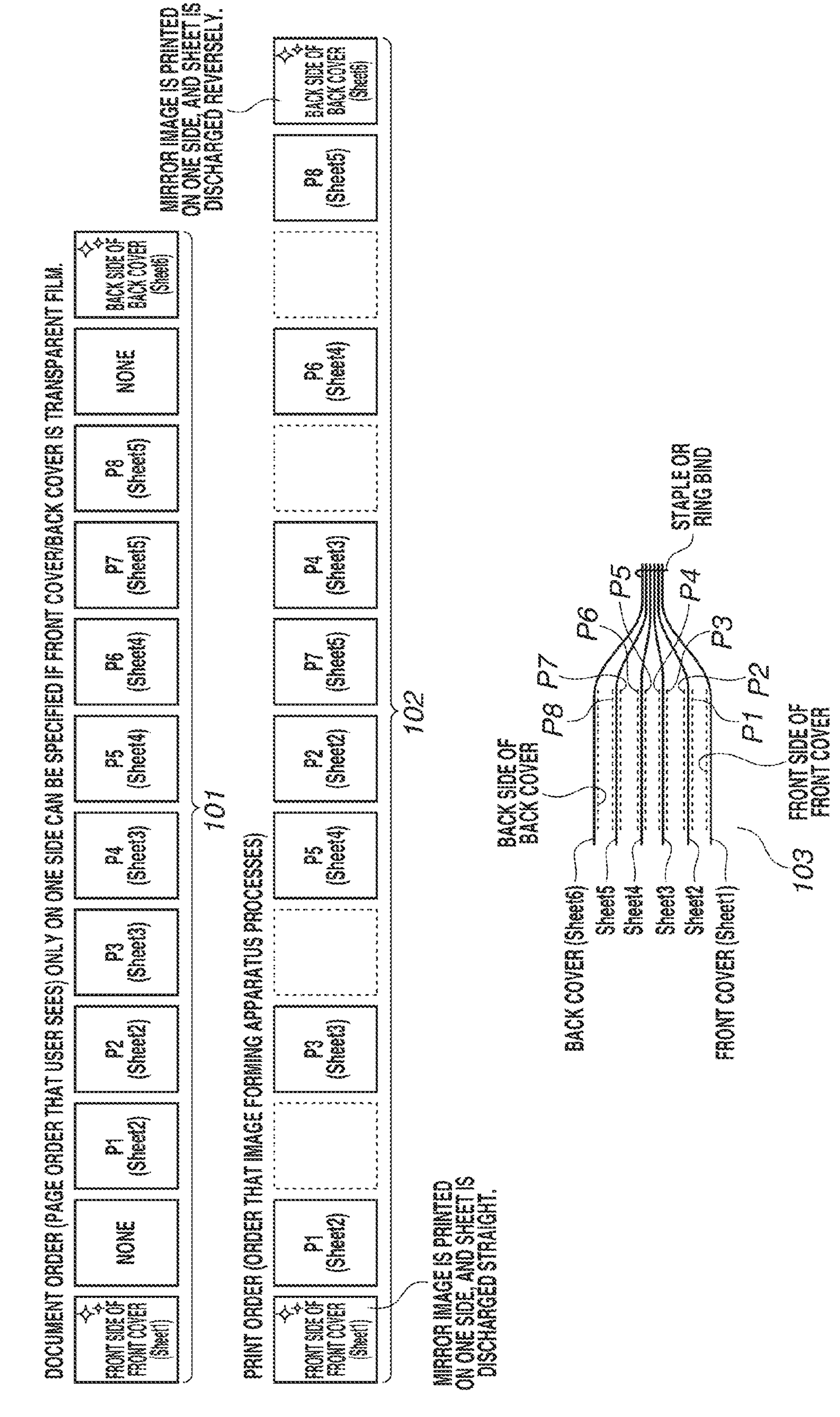
FIG. 1 illustrates control in an image forming apparatus according to a first exemplary embodiment.

FIG. 1 illustrates control by an image forming apparatus according to a first exemplary embodiment of the present invention, which is similar to the drawings in FIGS. 14 and 15.

In FIG. 1, a user refers to electronic data as the print document in a page order 101. In the page order 101, a transparent recording medium is selected for the front cover and the back cover. The image forming apparatus according to the first exemplary embodiment can specify only on one side of the transparent recording medium as a print side, which is described below.

The image forming apparatus performs processing in an order 102. The front side of the front cover is formed in a mirror image, and the front cover is subjected to single-sided conveyance and discharged straight. In this case, the mirror image is formed on the face-up side of the recording medium, so that the mirror image is printed on an inner side of the recording medium in an output result as indicated by a Sheet1 in a sheet bundle 103. Thus, when a user looks at the front cover of the sheet bundle 103, which is stapled or bound with rings, from the outside, the image printed on the inner side of the front cover can be seen as a normal image through the transparent recording medium.

Next, in the double-sided printing of a page P1 to a page P8, which are the body, image formation is efficiently performed by alternately feeding sheets with the front side up and the back side up as similar to that in FIGS. 14 and 15, and the sheets are output face down.

The back side of the back cover is formed in a mirror image, and the back cover is controlled to be subjected to single-sided conveyance and discharged reversely. Accordingly, the image printed on the face-up side is reversed to be a face-down side, namely an inner side of the sheet bundle on the discharge tray as indicated by a top sheet of the sheet bundle 103. When a user looks at the sheet bundle 103, which is stapled or bound with rings, from the outside, the image printed on the inner side of the back cover can be seen as a normal image through the transparent recording medium, as with the case of the front cover.

In FIG. 1, image formation in which an image on one page is arranged on one side of a sheet is described, however, images on a plurality of pages may be arranged on a sheet. For example, the image forming apparatus can perform control for saddle stitch bookbinding in which images on two pages are arranged on one side of a sheet.

Figure 2:
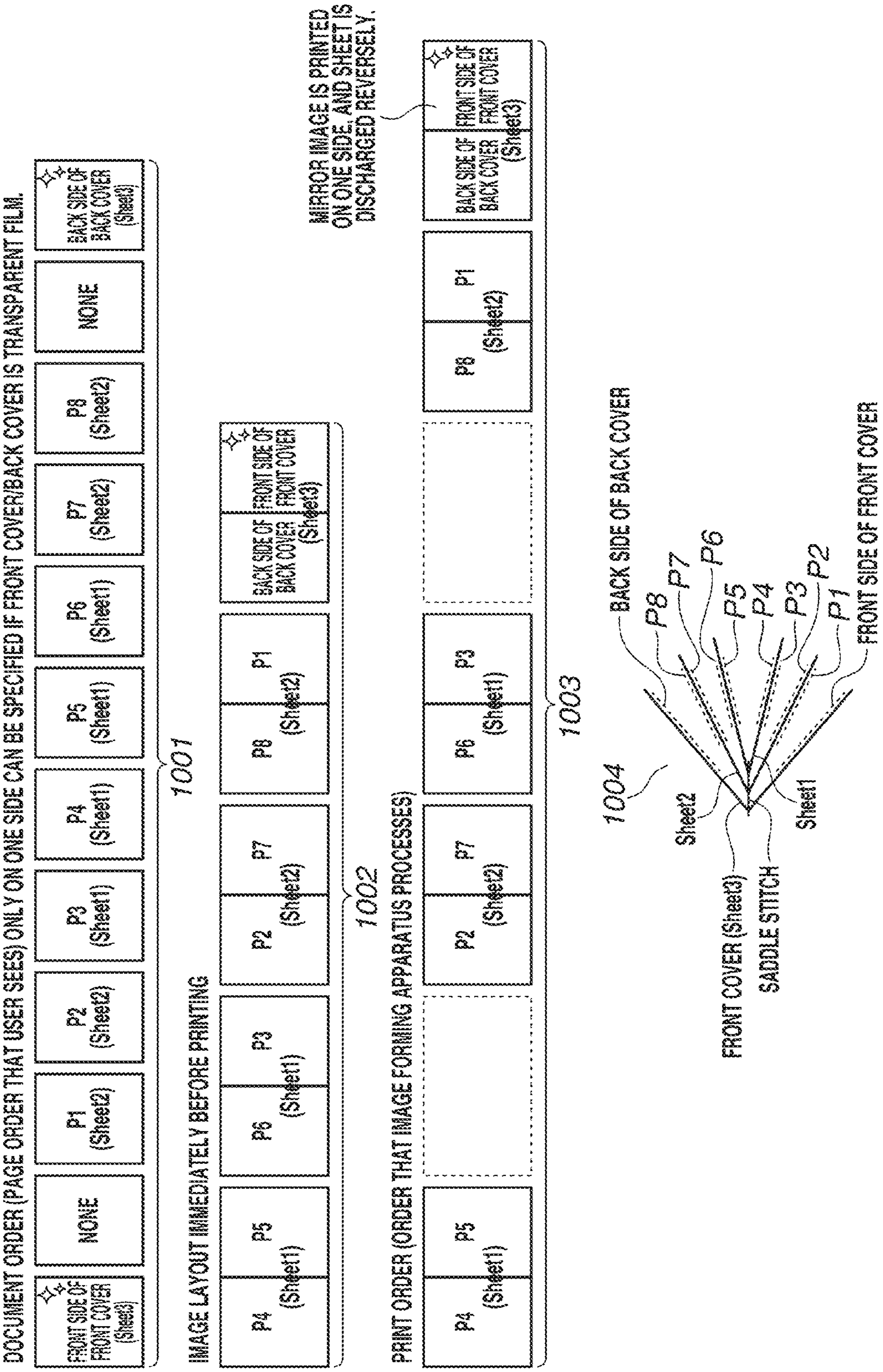
FIG. 2 illustrates control of saddle stitch bookbinding in the image forming apparatus according to the first exemplary embodiment.

FIG. 2 illustrates control of the saddle stitch bookbinding by the image forming apparatus according to the present invention, which is similar to the drawings in FIGS. 14 and 15. The saddle stitch bookbinding is a mode to perform a bookbinding operation in which images on two pages are arranged on one side of a sheet, and sheets are stapled and folded on the center.

A user refers to electronic data as the print document in a page order 1001. In the page order 1001, the transparent recording medium is also selected for the front cover and the back cover, and the image forming apparatus according to the first exemplary embodiment can specify only one side of the sheet as the print side, which is described below with reference to FIG. 9. An order 1002 is an image layout immediately before printing.

In this example, a page P4 and a page P5 are arranged on a front side of a first sheet, a page P6 and a page P3 are arranged on a back side of the first sheet, a page P2 and a page P7 are arranged on a front side of a second sheet, and a page P8 and a page P12 are arranged on a back side of the second sheet. Then, a back side of the back cover and a front side of the front cover are arranged on a third sheet at the end. The third sheet is a transparent recording medium and subjected to the single-sided printing. The sheet subjected to the image formation is reversely output and conveyed to a saddle stitch bookbinding unit. The conveyed first to third sheets are stapled and folded at the center of the sheets, and output as a sheet bundle 1004 on a saddle stitch bookbinding tray.

Images on the front cover and the back cover are formed on inner sides of the saddle stitch bookbinding. However, the images are printed in mirror images, so that when a user looks at the saddle stitch bookbinding from the outside, the images of the front cover and the back cover can be seen as normal images through the transparent recording medium.

The most characteristic control of the present exemplary embodiment is described above.

Figure 3:
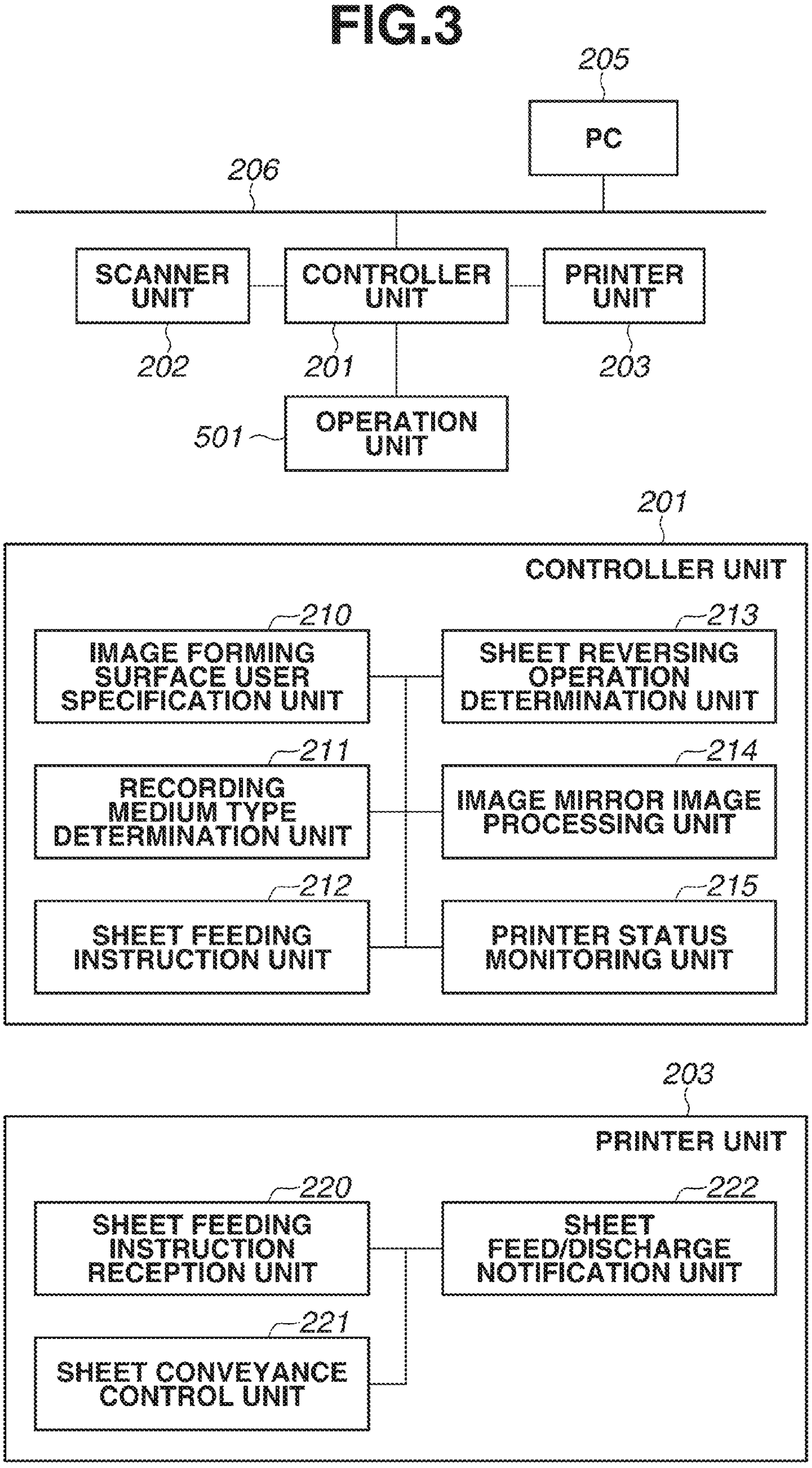
FIG. 3 illustrates a configuration of a system including the image forming apparatus according to exemplary embodiments.

Next, an entire image forming system which realizes the above control is described with reference to FIG. 3. FIG. 3 illustrates a system configuration including the image forming apparatus according to the present exemplary embodiment of the present invention.

The image forming apparatus according to the present exemplary embodiment includes a controller unit 201, a scanner unit 202, a printer unit 203, and an operation unit 501. The controller unit 201 is connected to the scanner unit 202, the printer unit 203, and the operation unit 501. The controller unit 201 is also connected to a client personal computer (PC) 205 via a network 206. The client PC 205 can input a job to the controller unit 201 using a printer driver or the like. The controller unit 201 performs characteristic control according to the present invention. The printer unit 203 can form an image on a sheet and discharge the sheet reversely or straight.

Next, the controller unit 201 and the printer unit 203 are described.

The controller unit 201 includes a central processing unit (CPU) 402, a read-only memory (ROM) 404, a dynamic random access memory (DRAM) 406, and the like, which are described below with reference to FIG. 5, and realizes functions of units 210 to 215 by the CPU 402 reading and executing a program stored in the ROM 404. The printer unit 203 includes a CPU, a ROM, a random access memory (RAM), and the like, which are not illustrated, in an inner controller, and realizes functions of units 220 to 222 by the CPU reading and executing a program stored in the ROM.

The controller unit 201 is described.

An image forming surface user specification unit 210 provides a user interface for a user to set a print side of a front cover and a back cover. The interface is described in detail below with reference to FIGS. 8 and 9. A recording medium type determination unit 211 performs processing for determining a sheet type set to each sheet feeding deck. A user can set or change a sheet type of each of sheet feeding decks provided for the image forming apparatus. A setting screen of the sheet type is described in detail below with reference to FIG. 10.

An image mirror image processing unit 214 determines whether to print an image as a normal image or to print an image by converting into a mirror image based on a determination result of whether a sheet type is a transparent recording medium by the recording medium type determination unit 211 and information of a specification of the print side specified by the image forming surface user specification unit 210. A sheet reversing operation determination unit 213 determines whether to discharge a sheet reversely or straight based on each determination result by the recording medium type determination unit 211 and specification information of the image forming surface user specification unit 210. A determination result of the sheet reversing operation determination unit 213 is notified the printer unit 203 from a sheet feeding instruction unit 212.

The printer unit 203 receives the information notified from the sheet feeding instruction unit 212 of the controller unit 201 by a sheet feeding instruction reception unit 220 and uses the information for control to cause a sheet conveyance control unit 221 to discharge a sheet reversely or straight. A sheet feed/discharge notification unit 222 has a function of notifying the controller unit 201 of information of each of the sheet feeding decks. The controller unit 201 receives the information notified from the sheet feed/discharge notification unit 222 by a printer status monitoring unit 215, and thus can recognize that various sheets including a transparent recording medium are set to which sheet feeding deck in the printer unit 203.

Figure 4:
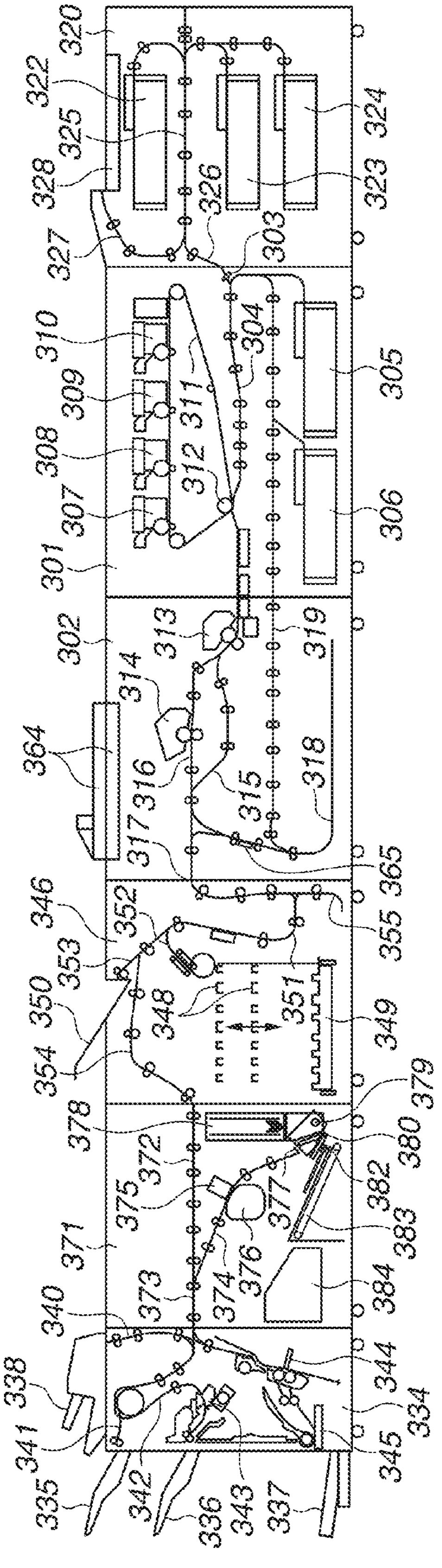
FIG. 4 illustrates an entire image forming apparatus according to the exemplary embodiments.

FIG. 4 is a schematic cross sectional view of a configuration of the image forming apparatus according to the present exemplary embodiment of the present invention.

As illustrated in FIG. 4, the image forming apparatus according to the present exemplary embodiment includes a plurality of apparatuses, such as the image forming apparatus main body 301, the image fixing apparatus 302, a sheet feeding apparatus, and a post-processing apparatus. Image formation on a sheet is performed by the combination of the image forming apparatus main body 301 and the image fixing apparatus 302.

As the sheet feeding apparatus, a large-capacity sheet feeding deck 320 is connected on the right side of the image forming apparatus main body 301. A plurality of the large-capacity sheet feeding decks 320 can be connected thereto.

As the post-processing apparatus, first, a large-capacity stacker 346 is connected on the left side of the image fixing apparatus 302. A plurality of the large-capacity stackers 346 can also be connected thereto. The ring binder 371 is connected on the left side of the large-capacity stacker 346. In addition, the finisher 334 is connected on the left side of the ring binder 371.

The image forming apparatus main body 301 includes sheet feeding decks 305 and 306 which operate as standard sheet feeding units. Development units 307 to 310 include four stations of yellow (Y), magenta (M), cyan (C), and black (K) for forming a color image. The image formed in the development units is primary transferred to an intermediate transfer belt 311. The intermediate transfer belt 311 rotates in a clockwise direction in the drawing, and the image is transferred at a secondary transfer position 312 from the intermediate transfer belt 311 to a sheet conveyed through a sheet conveyance path 304. The sheet on which the image transferred is delivered from the image forming apparatus main body 301 to the image fixing apparatus 302.

The sheet conveyed to the image fixing apparatus 302 is applied heat and pressure by a fixing unit 313, and thus the image on the sheet is fixed to the sheet. The sheet passed through the fixing unit 313 is conveyed to a position 317 via the conveyance path 315. If additional heating and pressuring is necessary according to the type of the sheet, the sheet passing through the fixing unit 313 is conveyed to a second fixing unit 314 using an upper conveyance path. After the additional heating and pressuring, the sheet is conveyed to the position 317 via the conveyance path 316.

When an image forming mode is a double-sided mode, the sheet is conveyed to a sheet reversing path 318 and reversed in the sheet reversing path 318. Then, the sheet is conveyed to a double-sided conveyance path 319 to be fed again to the image forming apparatus main body 301, and image formation is performed on a second side of the double-sided printing at a position 312. An image adjustment reading sensor 365 is disposed on the sheet path for the double-sided printing or on the sheet path for reversing operation. The image adjustment reading sensor 365 reads a test pattern printed on a sheet when full correction is performed without using a reader.

Sheets can be fed from three sheet feeding decks 322, 323, and 324 of the large-capacity sheet feeding deck 320 in addition to the above-described standard sheet feeding units of the image forming apparatus main body 301. The fed sheet is conveyed to the image forming apparatus main body 301 through the sheet conveyance paths 325 and 326 and subjected to image formation. The large-capacity sheet feeding deck 320 has a function of detecting overlapping feed in which a plurality of sheets is conveyed in an overlapping manner, and when overlapping feed is detected, the sheet conveyance path is switched from the normal sheet conveyance path 326 to a sheet conveyance path 327 to discharge sheet to an escape tray 328.

Next, the large-capacity stacker 346 of the post-processing apparatus is described.

The large-capacity stacker 346 includes two output destinations as sheet output trays, namely a discharge tray 350 and a stacking unit including a lift table 348 and an ejecting table 349. The large-capacity stacker 346 performs control to output overlapping fed sheets to the escape tray when recovering from a jam, and the overlapping fed sheets are output to the discharge tray 350.

The sheet on which image formation is completed is input from the image fixing apparatus 302 to a sheet conveyance unit of the large-capacity stacker 346 via the position 317. The sheet is stacked on the lift table 348 of the stacking unit via sheet conveyance paths 351 to 352. In a state in which no sheet bundle is stacked, the lift table 348 is at an illustrated upper position. As the stacked sheet bundles increases, the lift table 348 is controlled to be lowered as a height of the sheet bundles to maintain a top position of the stacked sheet bundles at a constant height. Further, when stacking of the sheet bundles is complete or the lift table 348 is fully loaded, the lift table 348 is lowered to a position of the ejecting table 349. When the lift table 348 and the ejecting table 349 are brought to the same height, positions of individual bars are alternating with each other. Thus, when the lift table 348 is lowered and comes to a position lower than the ejecting table 349, the sheet bundles are transferred to the ejecting table 349.

When a sheet is output to the discharge tray 350, the sheet is conveyed to the discharge tray 350 via the sheet conveyance paths 351 to 353. Further, when a sheet is conveyed to the post-processing apparatus on a subsequent stage of the large-capacity stacker 346, the sheet is conveyed to the post-processing apparatus via the sheet conveyance path 354.

A reversing unit 355 includes a mechanism for reversing a sheet. The reversing unit 355 is controlled to basically match an orientation at the position 317 of a sheet input to the large-capacity stacker 346 with an orientation of the sheet in the output destination. An escape unit is provided after the reversing unit 355, and when an abnormal operation, such as a jam and an error occurs, conveyable sheets are conveyed to the escape unit. Sheets which are conveyable and retained on the right side than the reversing unit 355 are controlled to be piled on the escape unit after the reversing unit 355.

Next, the ring binder 371 is described.

The sheet conveyed from the large-capacity stacker 346 to the ring binder 371 is further conveyed through a conveyance path 372. When ring binding is not performed, the sheet conveyed through the conveyance path 372 is further conveyed to the finisher 334 on a subsequent stage via a sheet conveyance path 373. When the ring binding is performed, the sheet conveyed through the conveyance path 372 is conveyed to a conveyance path 374 by switching back in the sheet conveyance path 373. A punching unit 375 performs punching for providing punch holes in the sheet. Punched chips are collected into a punch waste box 376. A plurality of sheets having punch holes are piled up at a position 377. A ring is taken out from a ring unit 378 and fed via a position 379 to a leading edge of the sheet bundle piled on the position 377, and ring binding is performed. A guide plate is opened and the ring bound sheet bundle is transferred from the position 377 to a position 382. Then, the ring bound sheet bundle is output by a belt conveyor 383 to a ring binder discharge tray 384.

Next, the finisher 334 is described.

The finisher 334 performs post processing on the printed sheet according to a function specified by a user. More specifically, the finisher 334 has functions of stapling (one stapling and two stapling), punching (two holes and three holes), saddle stitch bookbinding, and the like. The finisher 334 includes two discharge trays 335 and 336. When processing such as stapling is not performed, the sheet is output to the discharge tray 335 via a sheet conveyance path 341. The processing such as stapling cannot be performed in the sheet conveyance path 341. When the processing such as stapling is performed, the sheet is conveyed via a sheet conveyance path 342, subjected to finishing of the function specified by the user in a processing unit 343, and output to the discharge tray 336. The discharge trays 335 and 336 can move up and down, and the discharge tray 335 can be operated to be lowered to stack the sheet subjected to the finishing in the processing unit 343 from a lower discharge port.

When an insertion sheet is specified by a user, an insertion sheet set in an inserter 338 can be inserted into a predetermined page via a sheet conveyance path 340. When saddle stitch bookbinding is specified, a processing unit 344 performs stapling on a center of sheets, folds the sheets in half, and outputs the sheets to a saddle stitch bookbinding tray 337 via a sheet conveyance path 345. The saddle stitch bookbinding tray 337 has a belt conveyor configuration. The saddle stitched sheet bundle stacked on the saddle stitch bookbinding tray 337 is conveyed to the left by the belt conveyor.

Next, a scanner 364 and a document feeder are described.

A copy function of the scanner 364 is mainly used, and when a document is read by being set on a document positioning plate, the document is set on the document positioning plate, and the document feeder is closed. Then, an opening/closing sensor detects that the document positioning plate is closed, and a reflection type document size detection sensor provided in a housing of the scanner detects a size of the set document. The scanner 364 emits light from a light source based on the detected size, and a charge coupled device (CCD) reads an image, converts the read image into a digital signal, and performs predetermined processing thereon to convert into a laser recording signal. The converted laser recording signal is stored in a memory in the controller unit 201 described below with reference to FIG. 5.

In addition, when a document is read by being set on the document feeder, the document is placed face up on a document setting unit of the document feeder. Then, a document sensor detects the set document, and a document feed roller and a conveyance belt rotate to convey the document. Accordingly, the document is set on a predetermined position on the document positioning plate. After this, an image is read similarly to the reading by the document positioning plate, and the laser recording signal is stored in the memory in the controller. The scanner is used to read a test pattern in full correction using an image adjustment reader described in the present invention.

Next, a hardware configuration of the controller unit 201 illustrated in FIG. 1 is described in detail with reference to FIG. 5.

Figure 5:
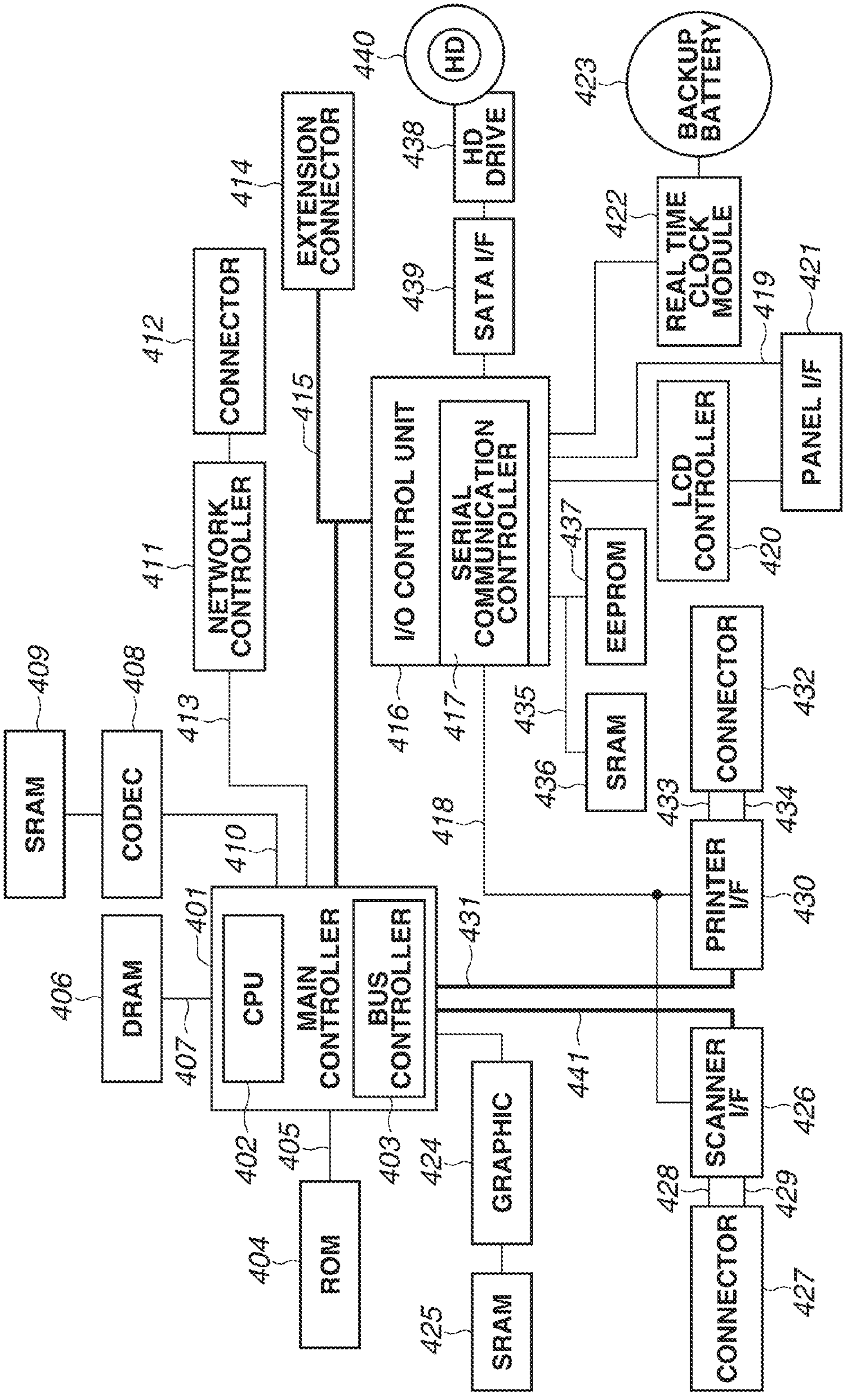
FIG. 5 illustrates a hardware configuration of a controller unit.

FIG. 5 illustrates an example of the hardware configuration of the controller unit 201.

A main controller 401 mainly includes the CPU 402, a bus controller 403, and various interface (I/F) controller circuits. The CPU 402 and the bus controller 403 control operations of the entire apparatus.

The CPU 402 operates based on a program read from the ROM 404 via a ROM I/F 405. The program includes a description of an operation to interpret page description language (PDL) code data received from the PC 205 and to develop the data to raster image data, and the program is processed by software.

The bus controller 403 controls data transfer input and output from each I/F and controls bus arbitration and direct memory access (DMA) data transfer.

The DRAM 406 is connected to the main controller 401 by a DRAM I/F 407 and used as a work area of the CPU 402 to operate and an area to accumulate image data pieces. A coder decoder (Codec) 408 compresses raster image data pieces accumulated in the DRAM 406 by the methods such as Modified Huffman (MH)/Modified READ (MR)/Modified Modified Read (MMR)/Joint Bi-level Image Experts Group (JBIG)/Joint Photographic Experts Group (JPEG), and the like, and expands compressed accumulated code data to the raster image data in reverse. A static random access memory (SRAM) 409 is used as a temporary work area of the Codec 408. The Codec 408 is connected to the main controller 401 via an I/F 410, and the data transfer between the Codec 408 and the DRAM 406 is the DMA transfer controlled by the bus controller 403.

A graphic processor 424 performs image rotation, image magnification, color space conversion, and binarization each on the raster image data accumulated in the DRAM 406. An SRAM 425 is used as a temporary work area of the graphic processor 424. The graphic processor 424 is connected to the main controller 401 via an I/F, and the data transfer between the graphic processor 424 and the DRAM 406 is the DMA transfer controlled by the bus controller 403.

A network controller 411 is connected to the main controller 401 by an I/F 413 and connected to an external network by a connector 412. The network generally includes Ethernet (registered trademark), however, is not limited to this.

An extension connector 414 for connecting an extension board and an input/output (I/O) control unit 416 are connected to a high-speed general-purpose bus 415. For the high-speed general-purpose bus, a peripheral component interconnect (PCI) bus is commonly used, however, it is not limited to the PCI bus. The I/O control unit 416 includes two channels of an asynchronous serial communication controller 417 for transmitting and receiving a control command to and from each CPU in the scanner unit 202 and in the printer unit 203. The I/O control unit 416 is connected to a scanner I/F circuit 426 and a printer I/F circuit 430 by an I/O bus 418.

A panel I/F 421 is connected to a liquid crystal display (LCD) controller 420 and includes an I/F for displaying an image on a liquid crystal screen on the operation unit 501 and a key input I/F for performing key input by a hard keys and touch panel keys. The operation unit 501 includes a liquid crystal display unit, a touch panel input device put on the liquid crystal display unit, and a plurality of hard keys, which are described in detail below with reference to FIG. 6. A signal input from the touch panel or the hard keys is transmitted to the CPU 402 via the panel I/F 421, and the liquid crystal display unit displays image data transmitted from the panel I/F 421. The liquid crystal display unit displays functions and image data.

A real time clock module 422 is used to update and store date and time managed in the apparatus and is backed up by a backup battery 423. A Serial Advanced Technology Attachment (SATA) interface 439 is used to connect to an external storage apparatus. According to the present exemplary embodiment, a hard disk drive 438 is connected via the SATA I/F 439 to perform an operation to store and read the image data in and from a hard disk 440, however, the operation is not limited to this. Connectors 427 and 432 are respectively connected to the scanner unit 202 and the printer unit 203 and respectively include asynchronous serial I/Fs 428 and 433 and video I/Fs 429 and 434.

A scanner I/F 426 is connected to the scanner unit 202 via the connector 427 and connected to the main controller 401 by a scanner bus 441. The scanner I/F 426 has a function of performing predetermined processing on an image received from the scanner unit 202. The scanner I/F 426 further has a function of outputting a control signal generated based on a video control signal transmitted from the scanner unit 202 to a scanner bus 429. The bus controller 403 controls the data transfer from the scanner bus 429 to the DRAM 406.

A printer I/F 430 is connected to the printer unit via a connector 432 and connected to the main controller 401 by a printer bus 431. The printer I/F 430 has a function of performing predetermined processing on the image data output from the main controller 401 and outputting the processed image data to the printer unit 203. The printer I/F 430 further has a function of outputting a control signal generated based on a video control signal transmitted from the printer unit to the printer bus 431. The bus controller 403 controls transfer to the printer unit of the raster image data developed on the DRAM 406, and DMA transfer of the raster image to the printer unit 203 is performed via the printer bus 431 and a video I/F 434.

An SRAM 436 is a memory which can maintain stored contents by a power source supplied from a backup battery if power to the entire apparatus is shut off and is connected to the I/O control unit via a bus 435. An electrically erasable and programmable read only memory (EEPROM) 437 is also a memory connected to the I/O control unit via the bus 435. The hardware configuration of the controller unit 201 has been described above.

Next, the operation unit 501 which performs various settings is described.

Figure 6:
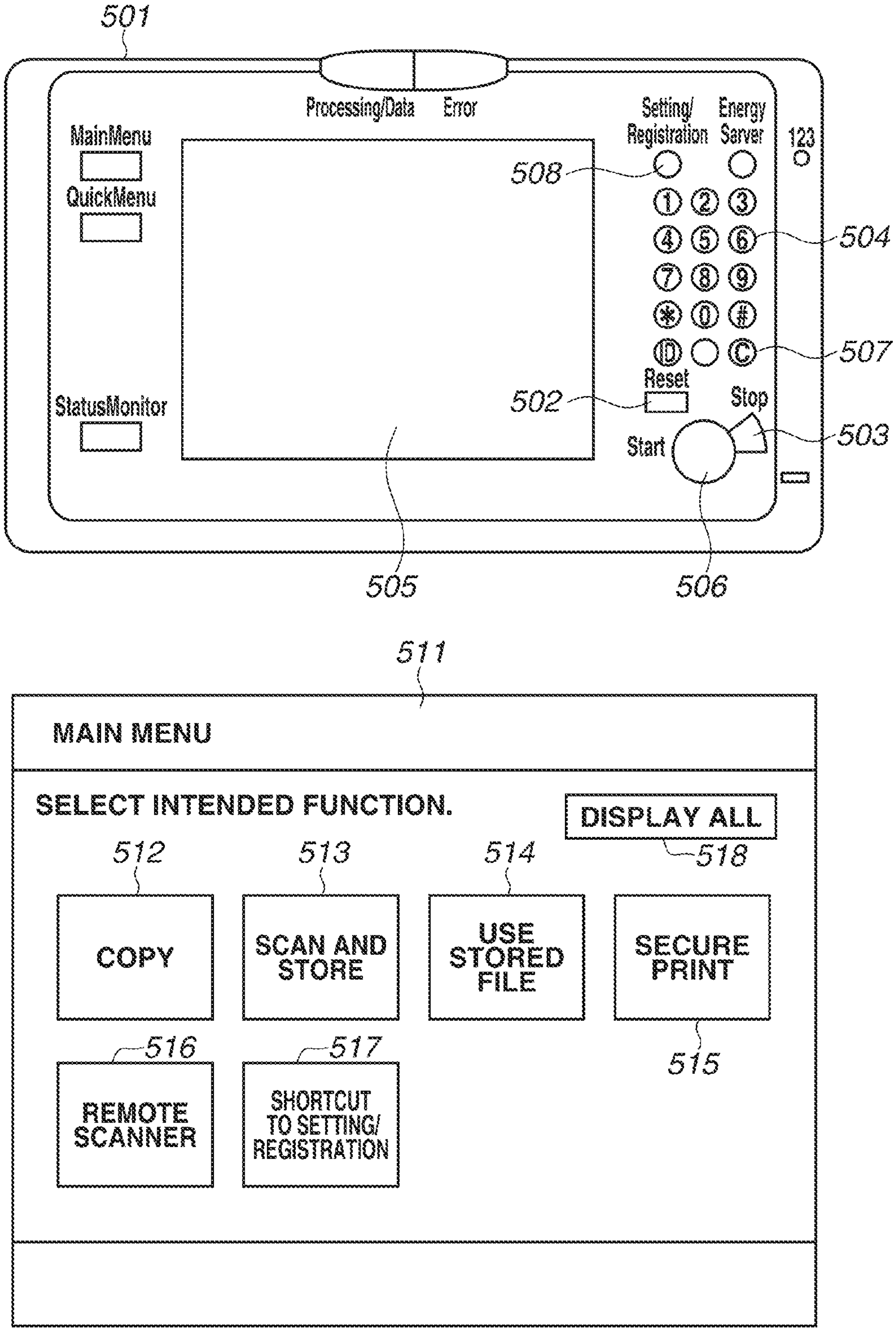
FIG. 6 illustrates a configuration of an operation panel.

FIG. 6 illustrates examples of configurations of the operation unit 501. The operation unit 501 illustrated in FIG. 6 is connected to the panel I/F 421 in FIG. 5.

A reset key 502 in the operation unit 501 is used to reset a setting value or the like set by a user. A stop key 503 is used to stop a job currently operating. A numeric key pad 504 is used to input a numerical value, such as a number of copies. A start key 506 is used to start a job, such as reading of a document. A clear key 507 is used to clear a setting or the like. An initial setting/registration button 508 is used to perform various settings including a setting of a sheet type. In addition to the above, a power saving button, a main menu display button, a quick menu button in which a customized screen can be formed for each user, and a status monitor button for displaying a status of the apparatus are provided as the hard keys in the operation unit 501.

A touch panel type operation screen 505 displays, for example, a screen of a main menu 511. When a user presses any of buttons 512 to 517 displayed on the touch panel 505 corresponding to an intended function, the screen is shifted to a setting screen of each function.

The buttons 512 to 517 are described below.

A copy function is assigned to the button 512. A function of scanning a document and storing its data in a hard disk is assigned to the button 513. A function of using a stored file, such as printing and transmitting the stored image data, is assigned to the button 514. A function of allowing a user to operate a print job with a password by secure print is assigned to the button 515. A remote scanner function of scanning a document and transmitting its image data to a PC by operating from the PC is assigned to the button 516. A shortcut function for shifting to the setting/registration button is assigned to the button 517.

Each part in the operation panel has been described above.

Next, a copy function screen which is displayed when the copy function button 512 is selected in the main menu 511 is described with reference to FIG. 7.

FIG. 7 illustrates examples of the copy function screen.

A copy function screen 601 includes a color selection button 603, a magnification specification button 604, a sheet selection button 605, a finishing button 606, a double-sided button 607, a density button 608, a document type button 609, an other function button 610, and the like.

When the color selection button 603 is pressed, a pull-down menu, not illustrated, is displayed, and a setting can be selected from color/monochromatic/automatic. In the example in FIG. 7, automatic is selected. The double-sided button 607 is used to specify double-sided printing. The density button 608 is used to specify density. The document type button 609 is used to select a type of a document. The other function button 610 is used to set other various application modes. The finishing button 606 is used to specify finishing, such as shift sorting and staple sorting. When the finishing button 606 is pressed, the screen is shifted to a screen 611 for selecting a type of the finishing.

As an entire setting, the finishing can be selected from any one of sorting 612, grouping 613, stapling 614, saddle stitch bookbinding 615, punching 616, and ring binding 617. For a further detail setting, whether to stack print products by shifting per copy can be selected by a shift button 618. A discharge side specification 619 is used to select whether to output an image print side face up or face down. A setting cancel button 620 is used to cancel settings. A return button 621 is used to return a top screen of the copy function. An OK button 622 is used to fix settings of the entire finishing.

When any of the stapling 614, the punching 616, and the ring binding 617 is selected, the screen is shifted to a corresponding setting screen (not illustrated). A setting of front cover/inserted sheet/back cover and a setting of an image forming surface can be performed on the setting screen. When an image forming surface setting button of the front cover is pressed on the setting screen, the screen is shifted to a front cover setting screen illustrated in FIG. 8. When the saddle stitch bookbinding 615 is selected, the screen is shifted to a saddle stitch bookbinding setting screen (not illustrated). The setting of the front cover/inserted sheet/back cover and the setting of the image forming surface can be performed on the saddle stitch bookbinding setting screen. When the image forming surface setting button of the front cover is pressed on the saddle stitch bookbinding setting screen, the screen is shifted to a front cover setting screen of the saddle stitch bookbinding illustrated in FIG. 9.

Next, the front cover setting screen for setting the image forming surface of the front cover/back cover is described with reference to FIG. 8.

Figure 8:
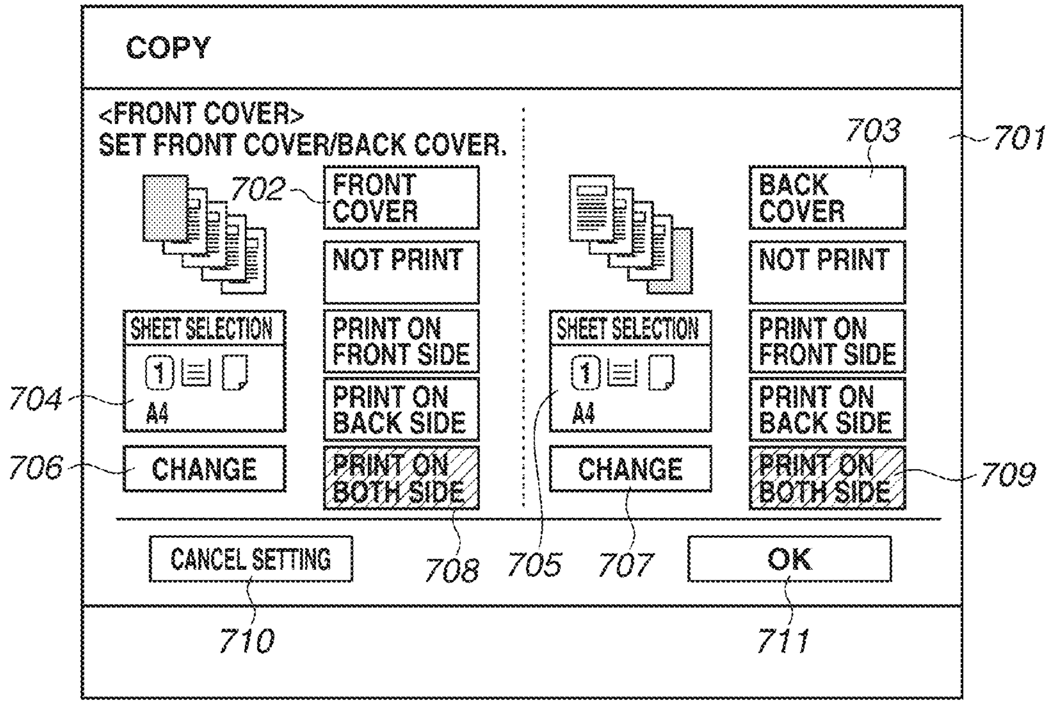
FIG. 8 illustrates an example of an operation screen of a front cover/back cover setting.

FIG. 8 illustrates an example of the front cover setting screen.

In FIG. 8, a front cover setting screen 701 is a user interface to specify the print side of the front cover and the back cover in the copy function. The front cover setting screen 701 is provided by the image forming surface user specification unit 210 illustrated in FIG. 3.

The front cover setting screen 701 includes a button 702 for selecting whether to set the front cover and a button 703 for selecting whether to set the back cover. When each of these buttons is selected, whether to print the relevant cover, and which side printing is performed when the relevant cover is printed can be selected.

Portions 704 and 705 display sheet feeding decks selected to respectively feed the front cover and the back cover. In the example in FIG. 8, a cassette 1 accommodating A4-size sheets is selected to both of the sheet feeding decks for feeding the front cover and the back cover. The sheet feeding decks for feeding the front cover and the back cover can be changed by respective change button 706 and 707.

When it is determined that a transparent recording medium is set as sheets in the sheet feeding deck selected as the sheet feeding deck for feeding the front cover or the back cover, a button 708 or 709 for double-sided printing is controlled to be displayed in a gray out state so as not to be selected. This control is performed by the image forming surface user specification unit 210. When the settings of the front cover and the back cover are cancelled, a user presses a setting cancel button 710. When the settings of the front cover and the back cover are fixed, a user presses an OK button 711.

Next, the front cover setting screen for setting the front cover/back cover of the saddle stitch bookbinding is described with reference to FIG. 9.

Figure 9:
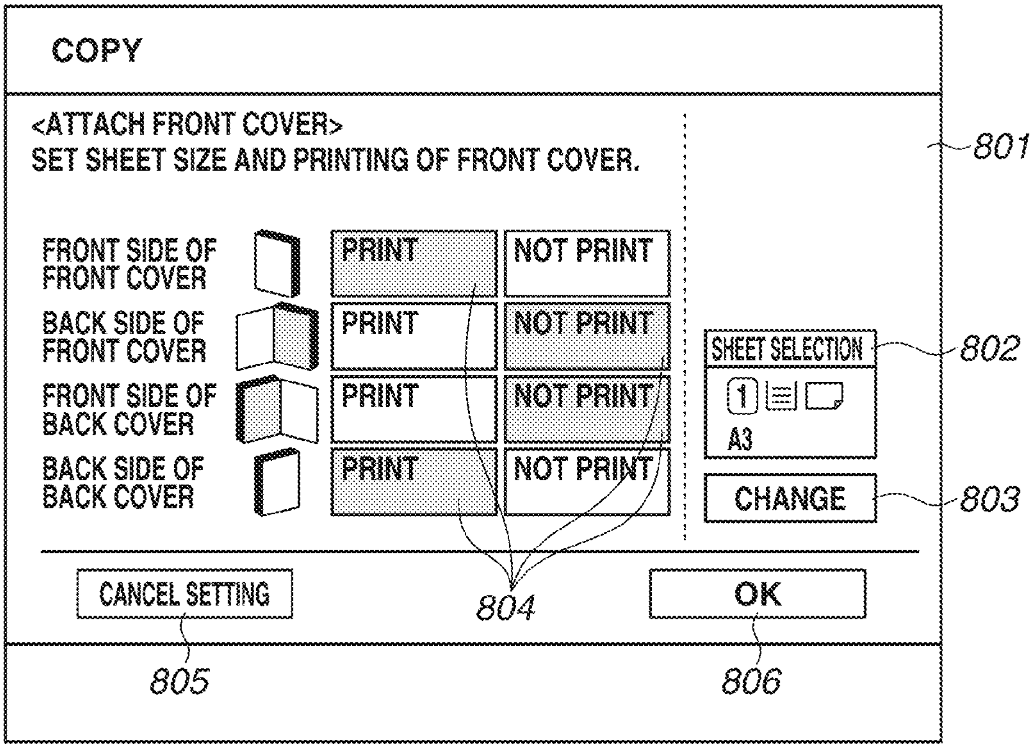
FIG. 9 illustrates an example of an operation screen of a front cover/back cover setting for saddle stitch bookbinding.

FIG. 9 illustrates an example of the front cover setting screen of the saddle stitch bookbinding.

In FIG. 9, a front cover setting screen 810 of the saddle stitch bookbinding is provided by the image forming surface user specification unit 210 illustrated in FIG. 3.

The front cover setting screen 801 of the saddle stitch bookbinding includes a sheet selection portion 802 displaying information of a selected sheet. When the sheet selected in the sheet selection portion 802 needs to be changed, the sheet feeding deck can be changed by pressing a change button 803.

The front cover setting screen 801 also includes four buttons 804 for setting the front cover and the back cover. The front cover setting screen 801 is different from the screen in FIG. 8 at a point that the front side of the front cover and the back side of the back cover are laid out on one page, the back side of the front cover and the front side of the back cover are laid out on one page, and printing is performed on a recording medium. Thus, if the transparent recording medium is selected in the sheet selection portion 802, it is necessary to prohibit a combination which performs double-sided printing on the sheet. Therefore, the image forming surface user specification unit 210 performs control to limit selecting "print" to two sides at a maximum among four buttons 804.

In addition, when the front side of the front cover is set to "print", the image forming surface user specification unit 210 controls the screen to allow to "print" only the back side of the back cover as a combination. Further, when the back side of the front cover is selected to "print", the image forming surface user specification unit 210 controls the screen to allow to "print" only the front side of the back cover for the other side as a combination. Accordingly, image formation is controlled not to be performed on both sides of the transparent recording medium.

Next, an operation for setting/changing the sheet type set to each sheet feeding deck is described with reference to FIG. 10.

FIG. 10 illustrates examples of screens for setting the sheet type.

First, a user selects a setting of the sheet type, the sheet feeding deck, and others from a setting screen (not illustrated) which is displayed when the initial setting/registration button 508 in FIG. 6 is pressed, so that the screen is shifted to a sheet type setting screen for registering a sheet type of the selected sheet feeding deck. When a surface nature button is pressed on the sheet type setting screen, a surface nature setting screen 901 is displayed. Further, when a color button is pressed on the sheet type setting screen, a color setting screen 903 is displayed.

The surface nature setting screen 901 is a screen for setting the surface nature of the sheet in the screens for registering the sheet type. As illustrated in FIG. 10, the surface nature setting screen 901 includes buttons indicating the surface natures of various sheet types (including at least a film 902).

The color setting screen 903 is a screen for setting color as another attribute of the sheet type in the screens for registering the sheet type. As illustrated in FIG. 10, the color setting screen includes buttons indicating colors of various sheet types (including at least a transparent 904).

When the film 902 is selected on the surface nature setting screen 901, and the transparent 904 is selected on the color setting screen 903, the recording medium type determination unit 211 determines that a recording medium set in the relevant sheet feeding deck is a transparent recording medium targeted in the present invention.

Next, a processing flow executed by the image forming apparatus according to the present exemplary embodiment is described with reference to flowcharts illustrated in FIGS. 11A and 11B.

Figure 11A:
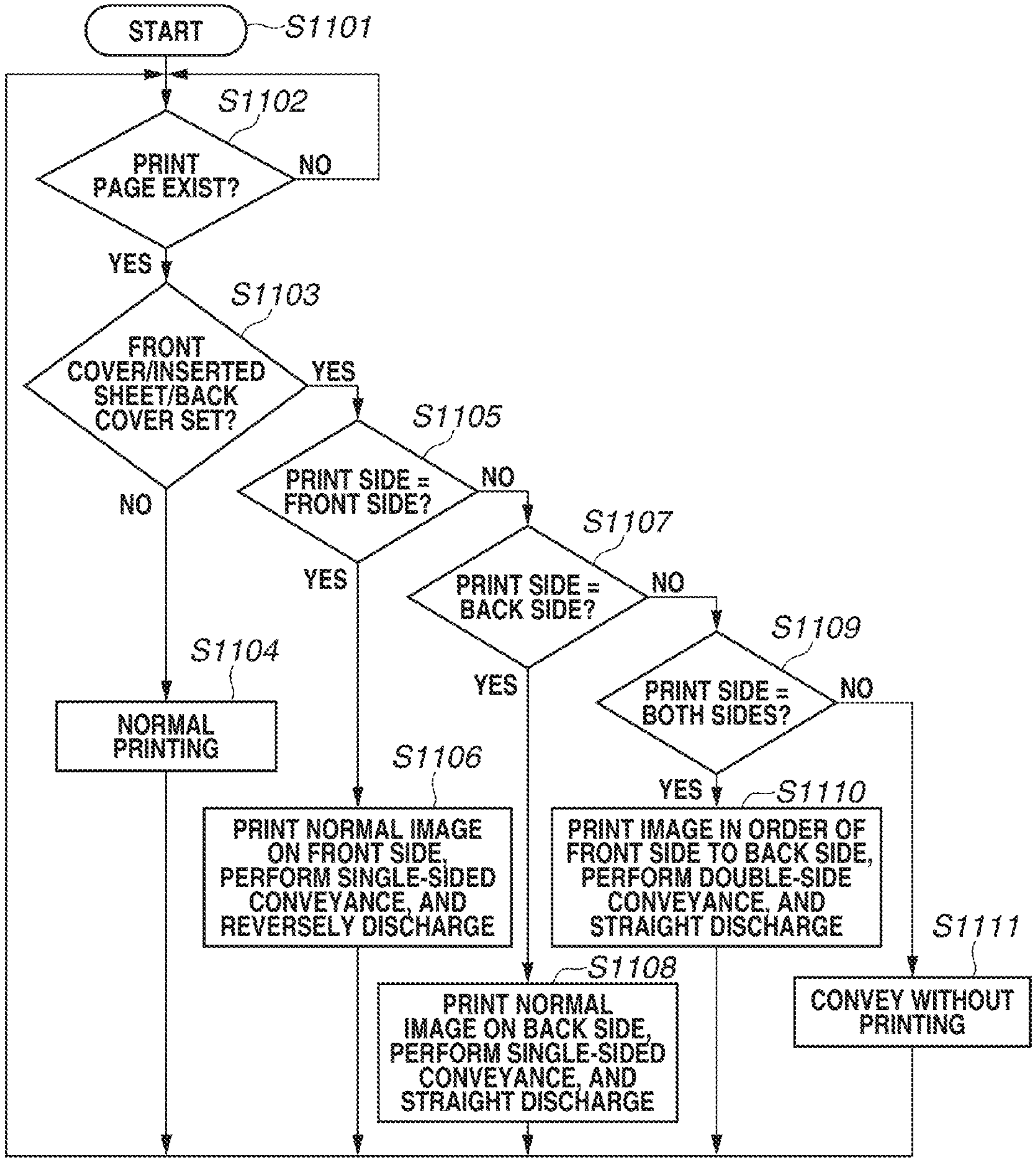
FIGS. 11A and 11B are flowcharts illustrating examples of control according to the first exemplary embodiment.
Figure 11B:
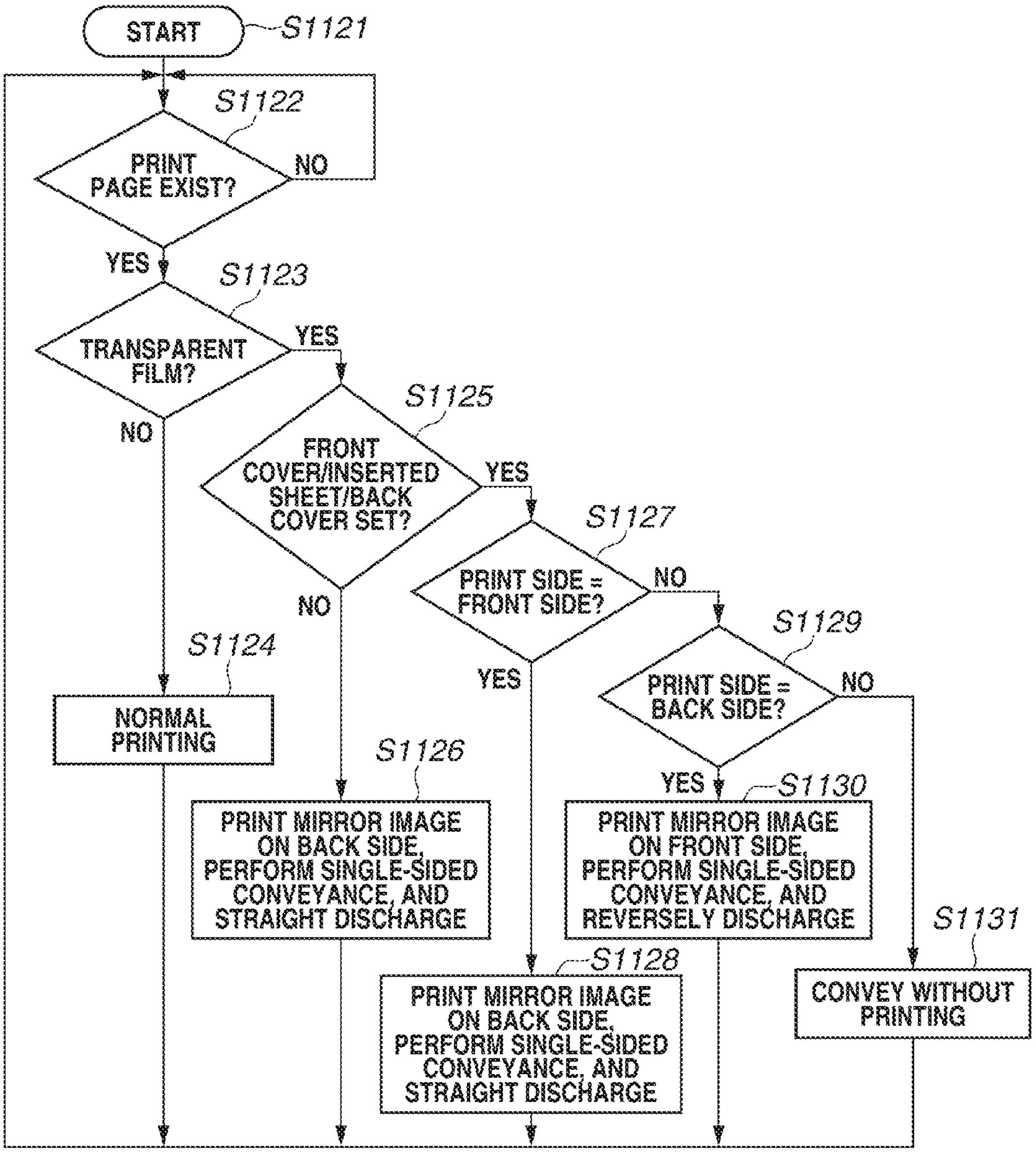

FIGS. 11A and 11B are the flowcharts illustrating control according to the first exemplary embodiment. Processing in the flowchart is realized by the CPU 402 in the controller unit 201 reading and executing a program stored in the ROM 404.

The control regarding the transparent recording medium which is the characteristic feature of the present invention is illustrated in the flowchart in FIG. 11B. Control regarding a common opaque recording medium is illustrated in the flowchart in FIG. 11A and described as a comparison.

First, processing for forming an image on the opaque recording medium is described with reference to FIG. 11A.

When the image forming apparatus is started up, the controller unit 201 shifts the processing from a start step S1101 to step S1102 and checks whether a print page exists. When, there is no print page (NO in step S1102), the controller unit 201 waits by repeating the processing in step S1102.

When a print job is input, and it is determined that the print page exists (YES in step S1102), the controller unit 201 advances the processing to step S1103. In step S1103, the controller unit 201 checks whether the front cover/inserted sheet/back cover are set to the print page. If it is determined that the front cover/inserted sheet/back cover are not set (NO in step S1103), the controller unit 201 advances the processing to step S1104. In step S1104, the controller unit 201 performs a normal print operation on the recording medium corresponding to the print page.

Whereas, in step S1103, if it is determined that the front cover/inserted sheet/back cover are set (YES in step S1103), the controller unit 201 performs control as follows. More specifically, the controller unit 201 determines whether the print side is only the front side, only the back side, both sides, or is not printed based on combinations of conditions in steps S1105, S1107, and S1109.

If it is determined that the print side is only the front side (YES in step S1105), the controller unit 201 advances the processing to step S1106. In step S1106, the controller unit 201 forms an image of the print page in a normal image on the front side of the recording medium, performs single-sided conveyance, and discharges the recording medium reversely.

If it is determined that the print side is only the back side (YES in step S1107), the controller unit 201 advances the processing to step S1108. In step S1108, the controller unit 201 performs control to form an image of the print page in a normal image on the back side of the recording medium, perform single-sided conveyance, and discharge the recording medium straight.

If it is determined that printing is performed on both sides (YES in step S1109), the controller unit 201 advances the processing to step S1110. In step S1110, the controller unit 201 performs control to form images of the print pages in normal images on the front side and then on the back side of the recording medium, perform double-sided conveyance, and discharge the recording medium straight.

If it is determined that printing is not performed (NO in steps S1105, S1107, and S1109), the controller unit 201 advances the processing to step S1111. In step S1111, the controller unit 201 only conveys the recording medium without performing the image forming operation.

When the processing is finished on one page (i.e., the processing in step S1106, S1108, S1110, or S1111 is finished), the controller unit 201 returns the processing to step S1102 and repeats the processing to check whether a next print page exists. According to the processing in the flowchart in FIG. 11A, the image of the print page is formed as a normal image in any of those cases.

Next, processing for forming an image on the transparent recording medium is described with reference to FIG. 11B.

When the image forming apparatus is started up, the controller unit 201 shifts the processing from a start step S1121 to step S1122 and checks whether a print page exists. When, there is no print page (NO in step S1122), the controller unit 201 waits by repeating the processing in step S1122.

When a print job is input, and it is determined that the print page exists (YES in step S1122), the controller unit 201 advances the processing to step S1123. In step S1123, the controller unit 201 determines whether the recording medium on which the print page is printed is a transparent film. If it is determined that the recording medium is not the transparent film (NO in step S1123), the controller unit 201 advances the processing to step S1124. In step S1124, the controller unit 201 performs the normal print processing of the print page on the recording medium. More specifically, the controller unit 201 performs the processing described in steps S1103 to S1111 in FIG. 11A.

Whereas, if it is determined that the recording medium is the transparent film (YES in step S1123), the controller unit 201 advances the processing to step S1125. In step S1125, the controller unit 201 checks whether the front cover/inserted sheet/back cover are set to the print page. If it is determined that the front cover/inserted sheet/back cover are not set (NO in step S1125), the controller unit 201 advances the processing to step S1126. In step S1126, the controller unit 201 forms an image of the print page in a mirror image on the back side of the recording medium, performs single-sided conveyance, and discharges the recording medium straight.

Whereas, in step S1125, if it is determined that the front cover/inserted sheet/back cover are set (YES in step S1125), the controller unit 201 determines whether the print side is only the front side, only the back side, or is not printed based on combinations of conditions in steps S1127 and S1129. In the case of the transparent recording medium, double-sided printing is not set, so that the determination of the double-sided printing is not performed.

If it is determined that the print side is only the front side (YES in step S1127), the controller unit 201 advances the processing to step S1128. In step S1128, the controller unit 201 forms an image of the print page in a mirror image on the back side of the recording medium which is an opposite side of the user specification (the front side), performs single-sided conveyance, and discharges the recording medium straight.

If it is determined that the print side is only the back side (YES in step S1129), the controller unit 201 advances the processing to step S1130. In step S1130, the controller unit 201 forms an image of the print page in a mirror image on the front side of the recording medium which is an opposite side of the user specification (the back side), performs single-sided conveyance, and discharges the recording medium reversely.

If it is determined that printing is not performed (NO in steps S1127 and S1129), the controller unit 201 advances the processing to step S1131. In step S1131, the controller unit 201 only conveys the recording medium without performing the image forming operation.

When the processing is finished on one page (i.e., the processing in step S1124, S1126, S1128, S1130, or S1131 is finished), the controller unit 201 returns the processing to step S1122 and repeats the processing to check whether a next print page exists.

The above-described print job may be a copy job which reads an image of a document and forms the read image on a sheet or a print job which forms an image based on image data on a sheet.

As described above, when a type of a sheet subjected to image formation is a transparent sheet, an image to be formed on the sheet is formed as a mirror image on an opposite side of an image forming surface specified to the sheet. Further, when a front side of the sheet is specified as the image forming surface, the sheet is controlled to be discharged without being reversed. When a back side of the sheet is specified as the image forming surface, the sheet is controlled to be discharged by being reversed. Thus, when an image of the front cover is formed on the transparent sheet, the control is performed to form a mirror image of the image of the front cover on the sheet and discharge the sheet without reversing the sheet. Further, when an image of the back cover is formed on the transparent sheet, the control is performed to form a mirror image of the image of the back cover on the sheet and discharge the sheet by reversing the sheet.

Thus, the image formation control and the sheet conveyance control regarding the transparent recording medium according to the first exemplary embodiment have been described above. As described above, according to the first exemplary embodiment, an output product which uses a transparent recording medium on a front cover and a back cover of a booklet like a catalogue and a pamphlet can be created as intended by a user. In other words, various output products using a transparent recording medium can be created as intended by a user.

According to the above-described first exemplary embodiment, the control method which performs only single-sided printing on a transparent recording medium is described. According to a second exemplary embodiment, a control method which performs double-sided printing on a transparent recording medium is described. The transparent recording medium is often generated by a glossy material like plastic, and when an image is seen through the recording medium, the image has a glossy texture. Further, when the image is directly seen from the print side of the recording medium, the image has a matte texture. The second exemplary embodiment which performs image formation using a combination of these image textures is described below.

Figure 12A:
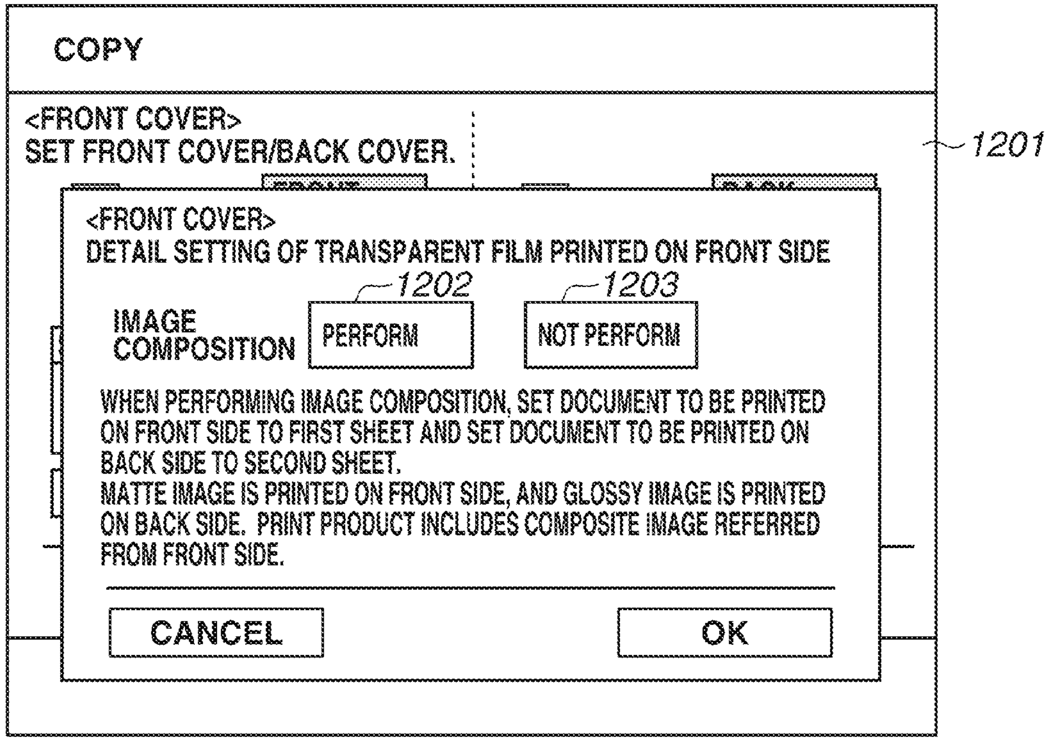
FIGS. 12A and 12B illustrate examples of detail setting screens for a front cover/back cover setting according to a second exemplary embodiment.
Figure 12B:
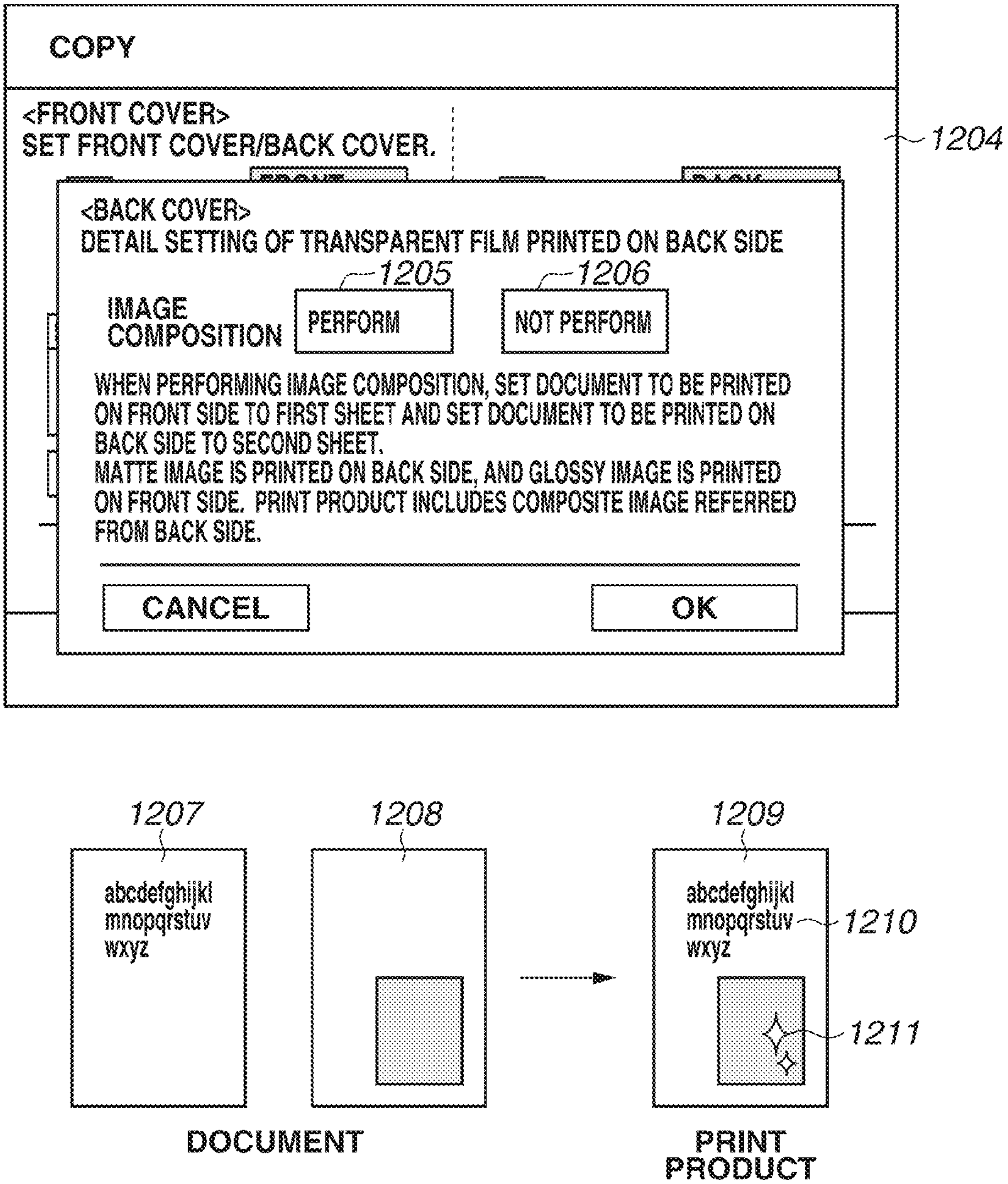

FIGS. 12A and 12B illustrate examples of setting screens on which settings of printing on the front side and the back side can be performed in detail regarding the front cover setting screen illustrated in FIG. 8.

According to the first exemplary embodiment, both of the setting for printing on the front side and the setting for printing on the back side cannot be set ON at the same time on the front cover setting screen in FIG. 8. According to the second exemplary embodiment, when “print on front side” or “print on back side” is selected on the front cover setting screen in FIG. 8, the detail setting screen in FIG. 12A or 12B is displayed.

A detail setting screen 1201 is displayed when “print on front side” is selected on the front cover setting. Further, a detail setting screen 1204 is displayed when “print on back side” is selected on the back cover setting.

If "print on front side" of the front cover is selected on the screen in FIG. 8 and a "not perform" image composition button 1203 is selected on the screen 1201, the control same as that of the first exemplary embodiment is performed. Whereas, if a "perform" image composition button 1202 is selected on the screen 1201, control is performed to respectively allocate a first page and a second page, which are two pages of document images prepared in advance, to the front side and the back side.

For example, when a text image 1207 and a filled area image 1208 are regarded as images of two pages prepared in advance, and the "perform" image composition button 1202 is selected, an image 1209 is obtained as an output result. In the image 1209, a text image 1210 is printed in a normal image on the front side of the transparent recording medium and has a matte texture. Further, in the image 1209, a filled area image 1211 is printed in a mirror image on the back side of the transparent recording medium and has a glossy texture since it is seen through the recording medium. Thus, the image 1209 is obtained as a resultant product in which the text image 1210 and the filled area image 1211 are combined.

Similarly, when "print on front side" of the back cover is selected on the screen in FIG. 8, and a "not perform" image composition button 1206 is selected on the screen 1204, the control same as that of the first exemplary embodiment is performed. Whereas, if a "perform" image composition button 1205 is selected on the screen 1204, control is performed to respectively allocate a first page and a second page, which are two pages of document images prepared in advance, to the front side and the back side. However, in the case of the back cover, a glossy image (which is visually recognized as a glossy texture image) is printed on the front side of the transparent recording medium, and a matte image (which is visually recognized as a matte texture image) is printed in a mirror image on the back side of the transparent recording medium. Accordingly, a resultant product similar to the front cover can be created as the back cover.

The same applies to the saddle stitch bookbinding, and when "print" of the front side (the back side) of the front cover (the back cover) is selected on the front cover setting screen of the saddle stitch bookbinding in FIG. 9, the detail setting screen in FIG. 12A or 12B is displayed and a similar resultant product can be created.

The above-described control is described with reference to a flowchart illustrated in FIG. 13.

Figure 13:
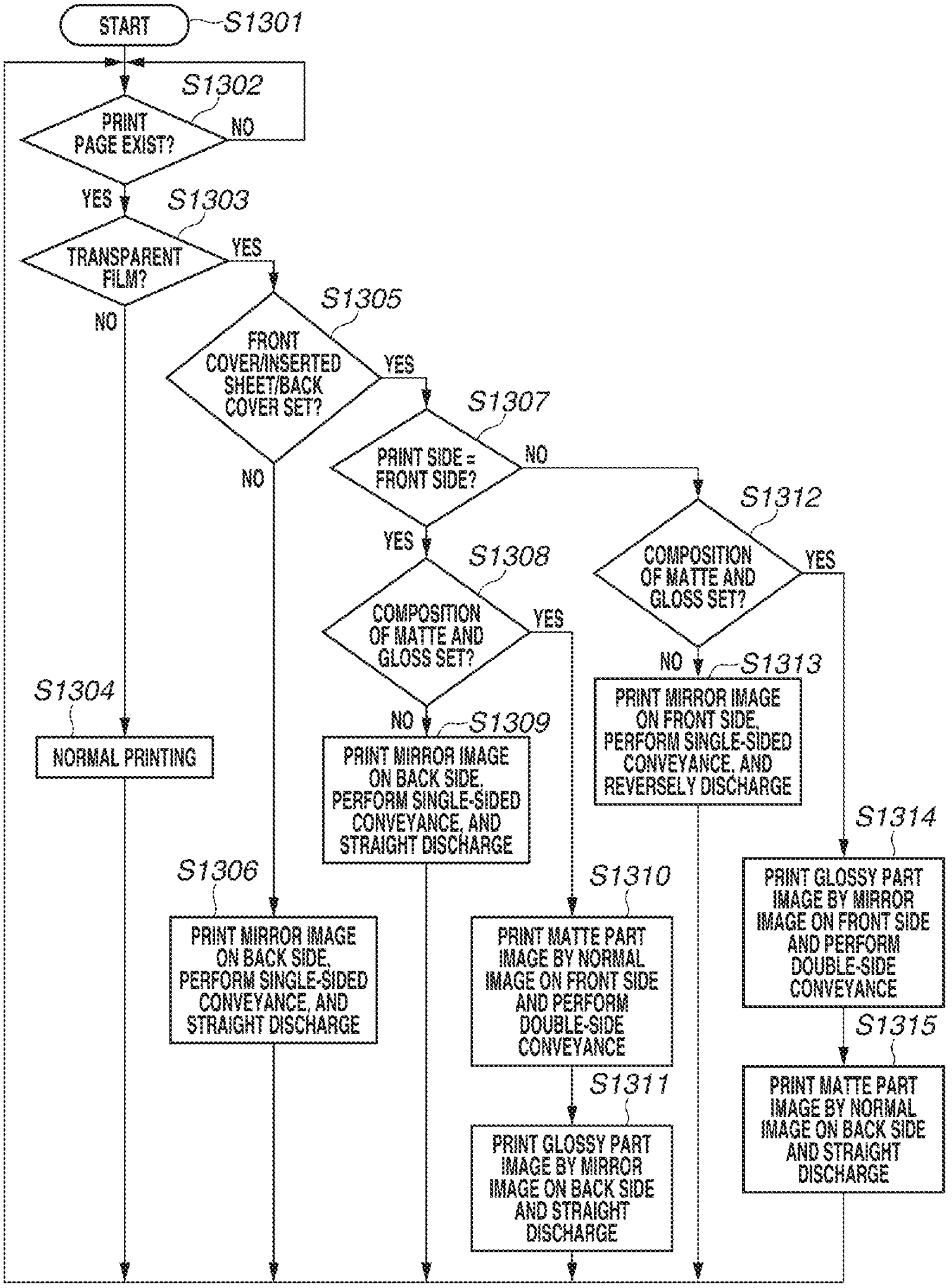
FIG. 13 is a flowchart illustrating an example of control according to the second exemplary embodiment.

FIG. 13 is the flowchart illustrating control according to the second exemplary embodiment. Processing in the flowchart is realized by the CPU 402 in the controller unit 201 reading and executing a program stored in the ROM 404.

When the image forming apparatus is started up, the controller unit 201 shifts the processing from a start step S1301 to step S1302 and checks whether a print page exists. When, there is no print page (NO in step S1302), the controller unit 201 waits by repeating the processing in step S1302.

When a print job is input, and it is determined that the print page exists (YES in step S1302), the controller unit 201 advances the processing to step S1303. In step S1303, the controller unit 201 determines whether the recording medium on which the print page is printed is a transparent film. If it is determined that the recording medium is not the transparent film (NO in step S1303), the controller unit 201 advances the processing to step S1304. In step S1304, the controller unit 201 performs the normal print processing of the print page on the recording medium. More specifically, the controller unit 201 performs the processing described in steps S1103 to S1111 in FIG. 11A.

Whereas, if it is determined that the recording medium is the transparent film (YES in step S1303), the controller unit 201 advances the processing to step S1305. In step S1305, the controller unit 201 checks whether the front cover/inserted sheet/back cover are set to the print page. If it is determined that the front cover/inserted sheet/back cover are not set (NO in step S1305), the controller unit 201 advances the processing to step S1306. In step S1306, the controller unit 201 forms an image of the print page in a mirror image on the back side of the recording medium, performs single-sided conveyance, and discharges the recording medium straight.

Whereas, in step S1305, if it is determined that the front cover/inserted sheet/back cover are set (YES in step S1305), then in step S1307, the controller unit 201 determines whether the print side is the front side or the back side.

If it is determined that the print side is the front side (YES in step S1307), the controller unit 201 advances the processing to step S1308. In step S1308, the controller unit 201 determines whether image composition is set. If it is determined that image composition is not set (NO in step S1308), the controller unit 201 advances the processing to step S1309. In step S1309, similarly to that in the first exemplary embodiment, the controller unit 201 forms an image of the print page in a mirror image on the back side of the recording medium which is an opposite side of the user specification (the front side), performs single-sided conveyance, and discharges the recording medium straight.

Whereas, if it is determined that image composition is set (YES in step S1308), the controller unit 201 advances the processing to step S1310. In step S1310, the controller unit 201 prints an image allocated as a matte part image in a normal image on the front side of the recording medium and performs double-sided conveyance. Next, in step S1311, the controller unit 201 prints an image allocated as a glossy part image in a mirror image on the back side of the recording medium. Then, the controller unit 201 discharges straight the sheet conveyed from the double-sided conveyance path to the discharge tray.

Further, if it is determined that the print side is the back side (NO in step S1307), the controller unit 201 advances the processing to step S1312. In step S1312, the controller unit 201 determines whether image composition is set. If it is determined that image composition is not set (NO in step S1312), the controller unit 201 advances the processing to step S1313. In step S1313, similarly to that in the first exemplary embodiment, the controller unit 201 forms an image of the print page in a mirror image on the front side of the recording medium which is an opposite side of the user specification (the back side), performs single-sided conveyance, and discharges the recording medium reversely.

Whereas, if it is determined that image composition is set (YES in step S1312), the controller unit 201 advances the processing to step S1314. In step S1314, the controller unit 201 prints an image allocated as a glossy part image in a normal image on the front side of the recording medium and performs double-sided conveyance. Next, in step S1315, the controller unit 201 prints an image allocated as a matte part image in a mirror image on the back side of the recording medium. Then, the controller unit 201 discharges straight the sheet conveyed from the double-sided conveyance path to the discharge tray.

When the processing is finished on one page (i.e., the processing in step S1304, S1306, S1309, S1311, or S1315 is finished), the controller unit 201 returns the processing to step S1302 and repeats the processing to check whether a next print page exists.

Image composition is not limited to composition of two images, and three or more images may be combined. In other words, if image composition is specified to a sheet to be subjected to image formation, the controller unit 201 may perform control to form any of a plurality of images on a specified image forming surface of the sheet in normal images. Then, the controller unit 201 may perform control to form mirror images of the other images on the opposite side of the image forming surface. Therefore, if image composition is specified to the front cover, normal images of any images in a plurality of images are formed on a front side of a sheet on which the front cover image is formed, and mirror images of the other images are formed on a back side of the sheet.

In addition, images are not limited to a glossy image (which is visually recognized as a glossy texture image) and a matte image (which is visually recognized as a matte texture image). For example, any different groups of images can be used as long as the images in the groups are visually recognized as different texture images.

Thus, the image formation control, the image composition control, and the sheet conveyance control regarding the transparent recording medium according to the second exemplary embodiment have been described above. As described above, according to the second exemplary embodiment, images which are obtained by combining a matte texture image and a glossy texture image can be formed on a transparent recording medium in addition to the effects of first exemplary embodiment. Further, various output products using a transparent recording medium can be created as intended by a user.

When an image is formed on a transparent sheet like an overhead projector (OHP) film, the image forming apparatus according to the present invention selects print sides of images on the transparent sheet of the front cover, on sheets of body, and on the transparent sheet of the back cover, selects whether a normal image or a mirror image, and determines the sheet discharge method by executing a job. Accordingly, the image forming apparatus performs control to output a correct print product. As described above, the present invention can determine the image printing method so as to output a correct print product when the transparent sheet is used to the front cover and the back cover by utilizing the advantage of the conveyance technique of a recording medium in the current image forming apparatus. Accordingly, various output products using the transparent recording medium can be created as intended by a user.

The present invention is not limited to image formation using a transparent recording medium and may perform similar control in the case of image formation using a different type of recording medium.

Further, data constitutions and contents are not limited to the above-described data pieces, and various constitutions and contents can be adopted corresponding to an application and a purpose.

While the present invention has been described with reference to the exemplary embodiments, it is to be understood that the invention can be realized by, for example, a system, an apparatus, a method, a program, or a storage medium. More specifically, the present invention may be applied in a system configured from a plurality of devices or an apparatus configured from a single device.

Further, configurations as combinations of the above-described exemplary embodiments are all encompassed by the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-072161, filed Mar. 31, 2014, which is hereby incorporated by reference herein in its entirety.

What is claimed is:

1. An image forming apparatus, comprising:

an image forming unit configured to form an image; and a control unit configured to cause the image forming unit to form a mirror image of an image for a front cover on a transparent sheet for the front cover and discharge the transparent sheet without reversing the transparent sheet, and cause the image forming unit to form a mirror image of an image for a back cover on a different transparent sheet and discharge the different transparent sheet by reversing the different transparent sheet.

2. The image forming apparatus according to claim 1, wherein, the control unit causes the image forming unit to form the mirror image of the image for the front cover on the transparent sheet for the front cover and discharge the transparent sheet without reversing the transparent sheet, causes the image forming unit to form an image on a sheet and discharge the sheet, and causes the image forming unit to form the mirror image of the image for the back cover on the different transparent sheet and discharge the different transparent sheet by reversing the different transparent sheet.

3. The image forming apparatus according to claim 1, wherein, in a case where image composition for combining a plurality of images is specified for the image of the front cover, the control unit performs control to form normal images of any images in the plurality of images on a first side of the transparent sheet on which the image of the front cover is formed and to form mirror images of other images of the plurality of images on a second side of the transparent sheet.

4. The image forming apparatus according to claim 3, wherein the plurality of images includes images in a first group and images in a second group of which texture is different from the images in the first group, wherein the any images are the images in the first group, and wherein the other images are the images in the second group.

5. The image forming apparatus according to claim 4, wherein the images in the first group are images visually recognized as matte texture images, and wherein the images in the second group are images visually recognized as glossy texture images.

6. A method for controlling an image forming apparatus, the method comprising:

causing an image forming unit to form a mirror image of an image for a front cover on a transparent sheet for the front cover and discharging the transparent sheet without reversing the transparent sheet; and causing the image forming unit to form a mirror image of an image for a back cover on a different transparent sheet and discharging the different transparent sheet by reversing the different transparent sheet.

7. A non-transitory storage medium storing a program for causing a computer to execute a method for controlling an image forming apparatus, the method comprising:

causing an image forming unit to form a mirror image of an image for a front cover on a transparent sheet for the front cover and discharging the transparent sheet without reversing the transparent sheet; and causing the image forming unit to form a mirror image of an image for a back cover on a different transparent sheet and discharging the different transparent sheet by reversing the different transparent sheet.

* * * * *